(12) United States Patent
Yang et al.

(10) Patent No.: US 11,871,450 B2
(45) Date of Patent: Jan. 9, 2024

(54) METHOD AND APPARATUS FOR TRANSMITTING OR RECEIVING SIGNAL IN WIRELESS COMMUNICATION SYSTEM

(71) Applicant: LG Electronics Inc., Seoul (KR)

(72) Inventors: Suckchel Yang, Seoul (KR); Seonwook Kim, Seoul (KR); Hanjun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 17/267,747

(22) PCT Filed: Aug. 12, 2019

(86) PCT No.: PCT/KR2019/010185
§ 371 (c)(1),
(2) Date: Feb. 10, 2021

(87) PCT Pub. No.: WO2020/032758
PCT Pub. Date: Feb. 13, 2020

(65) Prior Publication Data
US 2021/0321456 A1 Oct. 14, 2021

(30) Foreign Application Priority Data

Aug. 10, 2018 (KR) .................. 10-2018-0094036
Jan. 11, 2019 (KR) .................. 10-2019-0004195
(Continued)

(51) Int. Cl.
*H04W 74/08* (2009.01)
*H04L 1/1867* (2023.01)
(Continued)

(52) U.S. Cl.
CPC ....... *H04W 74/0816* (2013.01); *H04L 1/1896* (2013.01); *H04W 72/23* (2023.01); *H04W 74/006* (2013.01)

(58) Field of Classification Search
None
See application file for complete search history.

(56) References Cited

U.S. PATENT DOCUMENTS

2013/0322355 A1   12/2013   Seo et al.
2016/0302076 A1   10/2016   Chou et al.
(Continued)

FOREIGN PATENT DOCUMENTS

CN   104321994   1/2015
CN   104904154   9/2015
(Continued)

OTHER PUBLICATIONS

Huawei, HiSilicon, "NR frame structure and scheduling on unlicensed bands," R1-1803678, 3GPP TSG RAN WG1 Meeting #92bis, Sanya, China, dated Apr. 16-20, 2018, 10 pages.
(Continued)

*Primary Examiner* — Clemence S Han
(74) *Attorney, Agent, or Firm* — Fish & Richardson P.C.

(57) ABSTRACT

In a method and apparatus for transmitting or receiving a signal in a wireless communication system according to an embodiment of the present invention, an LBT is performed on a plurality of PUCCH resources corresponding to a PRI value received through DCI, and ACK/NACK information is transmitted in a PUCCH resource on which the LBT has succeeded.

11 Claims, 21 Drawing Sheets

(30) Foreign Application Priority Data

| | | |
|---|---|---|
| Jan. 24, 2019 | (KR) | 10-2019-0009466 |
| Feb. 15, 2019 | (KR) | 10-2019-0017663 |
| Mar. 29, 2019 | (KR) | 10-2019-0036833 |

(51) Int. Cl.
H04W 74/00 (2009.01)
H04W 72/23 (2023.01)

(56) References Cited

U.S. PATENT DOCUMENTS

| | | | |
|---|---|---|---|
| 2016/0374084 A1 | 12/2016 | Zhang | |
| 2020/0044791 A1* | 2/2020 | Tsai | H04L 1/1861 |
| 2021/0167900 A1* | 6/2021 | Karaki | H04L 1/1854 |
| 2021/0297190 A1* | 9/2021 | Baldemair | H04L 1/1896 |
| 2021/0344451 A1* | 11/2021 | Hedayat | H04L 1/1861 |

FOREIGN PATENT DOCUMENTS

| | | |
|---|---|---|
| CN | 107113096 | 8/2017 |
| EP | 3777003 | 2/2021 |
| EP | 3834327 | 6/2021 |
| KR | 10-2012-0123848 | 11/2012 |
| KR | 10-2015-0060118 | 6/2015 |
| WO | WO2017131465 | 8/2017 |
| WO | WO2017171325 | 10/2017 |
| WO | WO2018016794 | 1/2018 |
| WO | WO2019216620 | 11/2019 |
| WO | WO2020033623 | 2/2020 |

OTHER PUBLICATIONS

PCT International Search Report and Written Opinion in International Appln. No. PCT/KR2019/010185, dated Dec. 10, 2019, 17 pages (with English translation).

Extended European Search Report in European Appln. No. 19846957.9, dated Aug. 5, 2021, 11 pages.

Huawei & HiSilicon, "HARQ enhancements in NR unlicensed," R1-1805918, Presented at 3GPP TSG RAN WG1 Meeting #93, Busan, Korea, May 21-May 25, 2018, 5 pages.

Office Action in European Appln. No. 19846957.9, dated Apr. 7, 2022, 7 pages.

Ericsson, ST-Ericsson, LG Electronics, Samsung, "Joint transmission of ACK/NACK and SR with PUCCH format 3," 3GPP TSG-RAN1 Meeting #65, R1-111895, Barcelona, Spain, May 8-13, 2011, 8 pages.

Office Action in Chinese Appln. No. 201980052576.3, dated Jun. 30, 2023, 19 pages (with English translation).

* cited by examiner (a) Carrier aggregation between L-band and U-band (b) Standalone U-band(s)

(a) Previous A/N feedback is successfully transmitted (e.g., LBT success)

(b) Previous A/N feedback is not successfully transmitted (e.g., LBT fail)

METHOD AND APPARATUS FOR TRANSMITTING OR RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2019/010185, filed on Aug. 12, 2019, which claims the benefit of Korean Application Nos. 10-2019-0036833, filed on Mar. 29, 2019, 10-2019-0017663, filed on Feb. 15, 2019, 10-2019-0009466, filed on Jan. 24, 2019, 10-2019-0004195, filed on Jan. 11, 2019, and 10-2018-0094036, filed on Aug. 10, 2018. The disclosures of the prior applications are incorporated by reference in their entirety.

TECHNICAL FIELD

The present disclosure relates to a method and apparatus used in a wireless communication system, and more particularly, to a method and apparatus for transmitting and receiving a signal in an unlicensed band.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

Provided are a signal transmission and reception method and apparatus for efficiently transmitting a hybrid automatic repeat request-acknowledgment (HARQ-ACK) in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for receiving a signal in a wireless communication system.

In an aspect of the present disclosure, a method of transmitting and receiving a signal in an unlicensed band by a communication apparatus in a wireless communication system includes receiving downlink control information (DCI) including downlink scheduling information and a physical uplink control channel (PUCCH) resource indicator (PM), receiving downlink data based on the DCI, performing listen-before-talk (LBT) for a plurality of PUCCH resources corresponding to a value of the PM, and transmitting acknowledgment/negative acknowledgment (ACK/NACK) information for the downlink data in one or more PUCCH resources in which LBT is successful among the plurality of PUCCH resources.

In another aspect of the present disclosure, a communication apparatus for transmitting and receiving a signal in an unlicensed band in a wireless communication system includes at least one transceiver, at least one processor, and at least one memory operatively coupled to the at least one processor and storing instructions which when executed, cause the at least one processor to perform specific operations. The specific operations include receiving DCI including downlink scheduling information and a PM, receiving downlink data based on the DCI, performing LBT for a plurality of PUCCH resources corresponding to a value of the PM, and transmitting ACK/NACK information for the downlink data in one or more PUCCH resources in which LBT is successful among the plurality of PUCCH resources.

In the method and apparatus, the plurality of PUCCH resources may be distinguished in the time domain, and the one or more PUCCH resources may include a PUCCH resource in which the LBT is initially successful as a result of performing the LBT for the plurality of PUCCH resources sequentially in the time domain.

In the method and apparatus, the plurality of PUCCH resources may have the same PUCCH format and the same resource block allocation.

In the method and apparatus, the plurality of PUCCH resources may be distinguished in the frequency domain, and the one or more PUCCH resources may be one or more PUCCH resource in which the LBT is initially successful as a result of performing the LBT for the plurality of PUCCH resources simultaneously in the frequency domain.

In the method and apparatus, when an uplink signal is transmitted in a plurality of subbands of consecutive symbols in the one or more PUCCH resources, the ACK/NACK information may be transmitted in a plurality of PUCCH resources belonging to the plurality of subbands, and when an uplink signal is not transmitted in a plurality of subbands of consecutive symbols in the one or more PUCCH resources, the ACK/NACK information may be transmitted in one PUCCH resource.

In the method and apparatus, when a channel occupancy time (COT) secured by a base station (BS) exists in a plurality of subbands, the ACK/NACK information may be transmitted in a plurality of PUCCH resources belonging to the plurality of subbands, and when a COT secured by the BS does not exist in a plurality of subbands, the ACK/NACK information may be transmitted in one PUCCH resource.

In the method and apparatus, when an LBT type configured for transmission of the ACK/NACK information is a first type, the number of the plurality of PUCCH resources corresponding to the value of the PM may be set to be smaller than the number of a plurality of PUCCH resources corresponding to the value of the PM, when the LBT type is a second type.

In the method and apparatus, the communication apparatus may include an autonomous driving vehicle communicable with at least a user equipment (UE), a network, and another autonomous driving vehicle other than the communication apparatus.

Advantageous Effects

According to an embodiment of the present disclosure, a communication apparatus may transmit a hybrid automatic repeat request-acknowledgment (HARQ-ACK) more efficiently by an operation differentiated from a legacy operation.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3$^{rd}$ generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
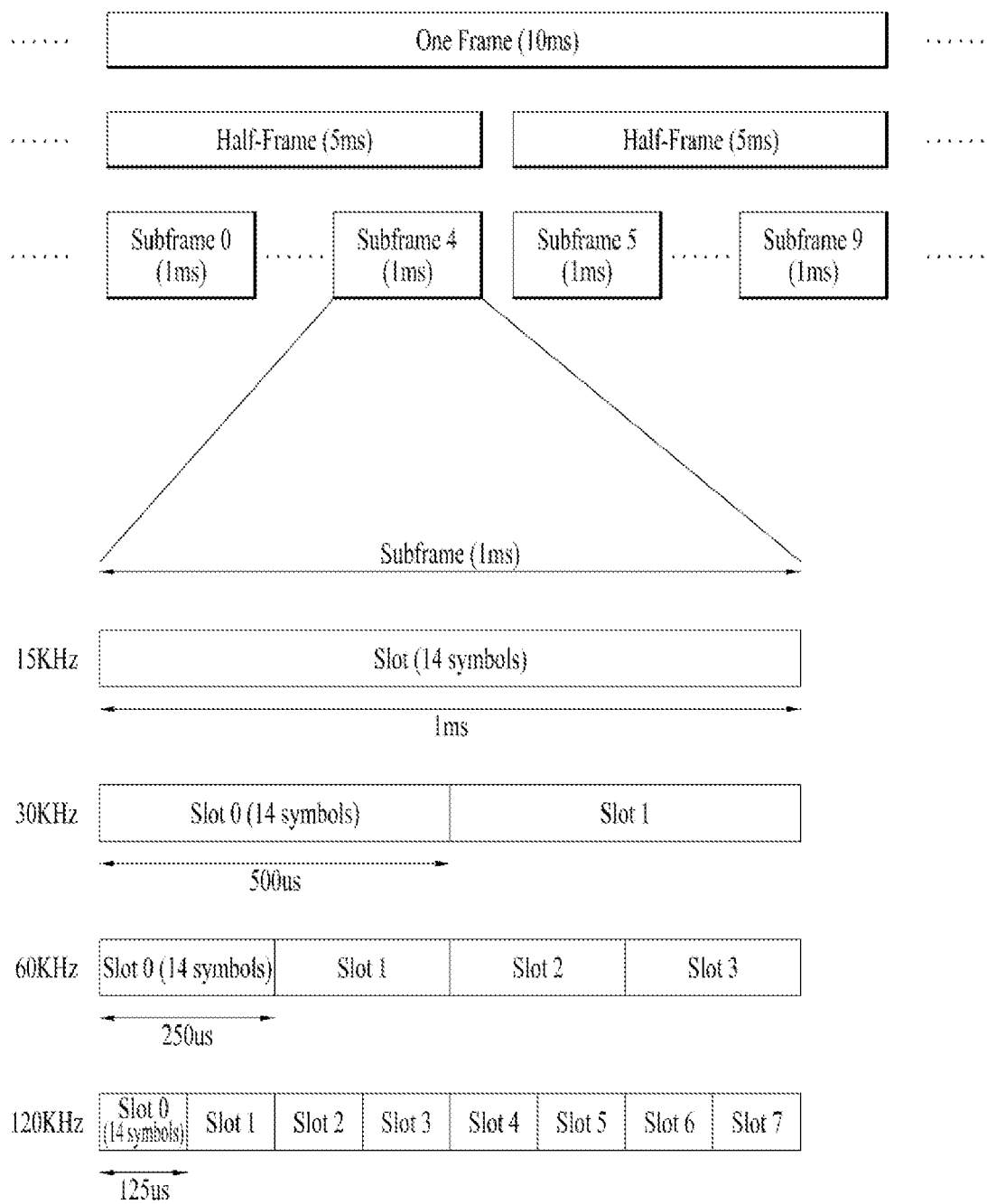
FIG. 1 illustrates a radio frame structure.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | $N^{slot}_{symb}$ | $N^{frame,u}_{slot}$ | $N^{subframe,u}_{slot}$ |
|---|---|---|---|
| 15KHz (u=0) | 14 | 10 | 1 |
| 30KHz (u=1) | 14 | 20 | 2 |
| 60KHz (u=2) | 14 | 40 | 4 |
| 120KHz (u=3) | 14 | 80 | 8 |
| 240KHz (u=4) | 14 | 160 | 16 |

* $N^{slot}_{symb}$: number of symbols in a slot
* $N^{frame,u}_{slot}$: number of slots in a frame
* $N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | $N^{slot}_{symb}$ | $N^{frame,u}_{slot}$ | $N^{subframe,u}_{slot}$ |
|---|---|---|---|
| 60KHz (u=2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 2:
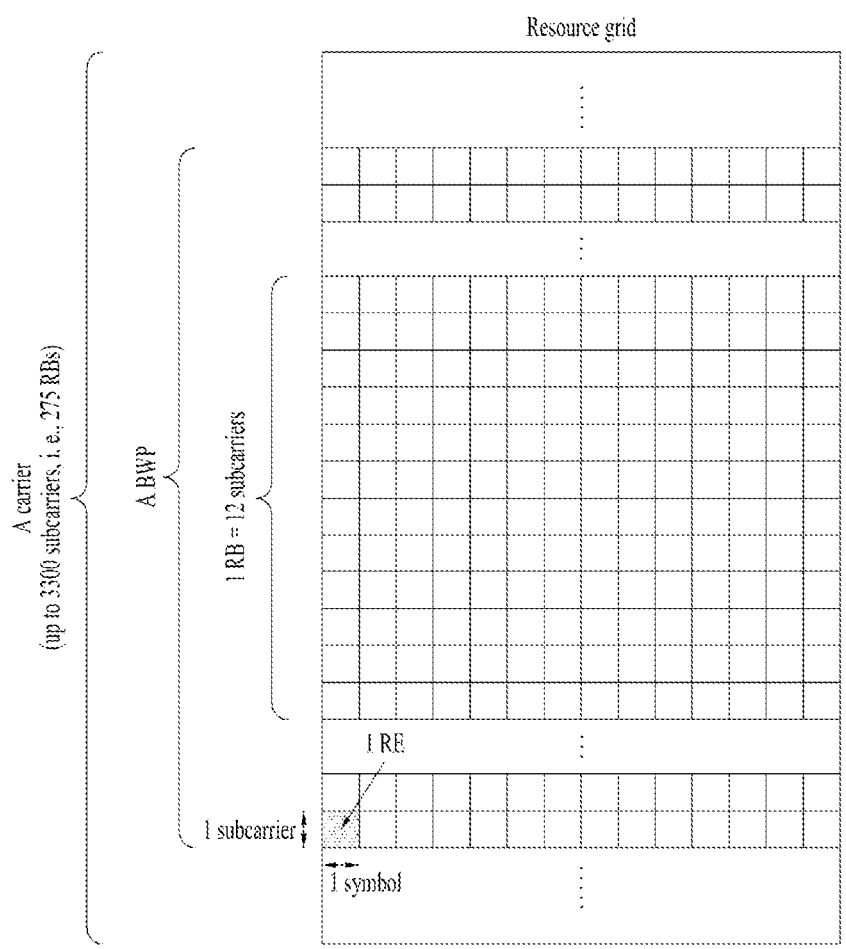
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 3:
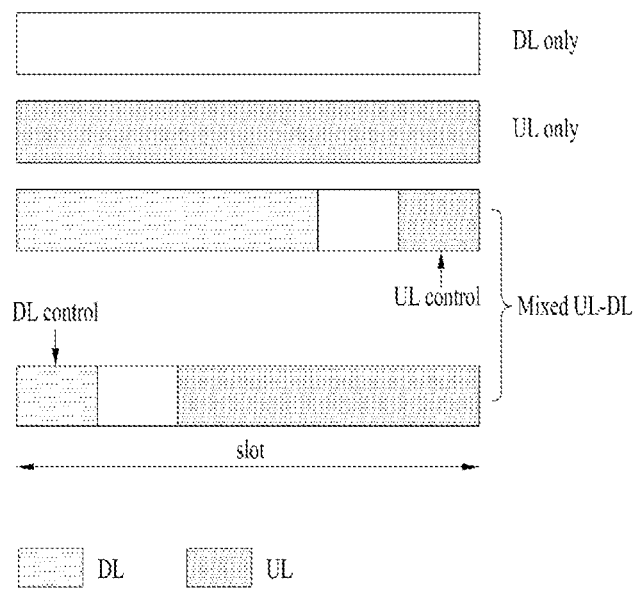
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

Figure 4:
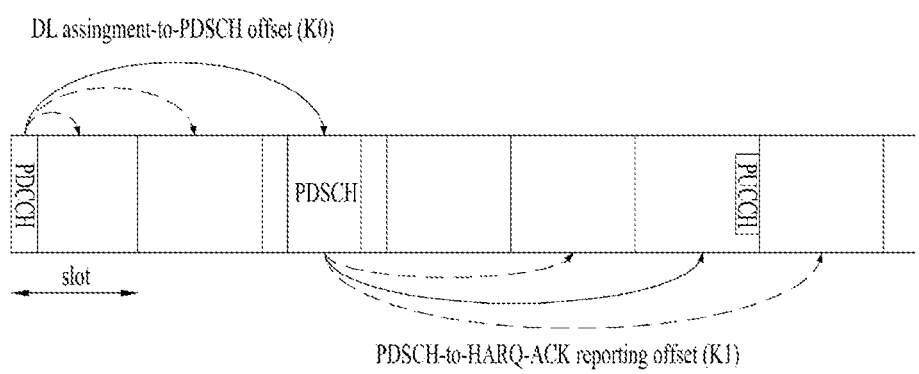
FIG. 4 illustrates an acknowledgment/negative acknowledgment (ACK/NACK) transmission process.

FIG. 4 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 5:
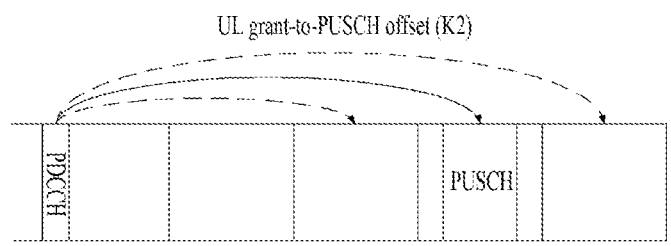
FIG. 5 illustrates a physical uplink shared channel (PUSCH) transmission process.

FIG. 5 illustrates an exemplary PUSCH transmission process. Referring to FIG. 5, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 6:
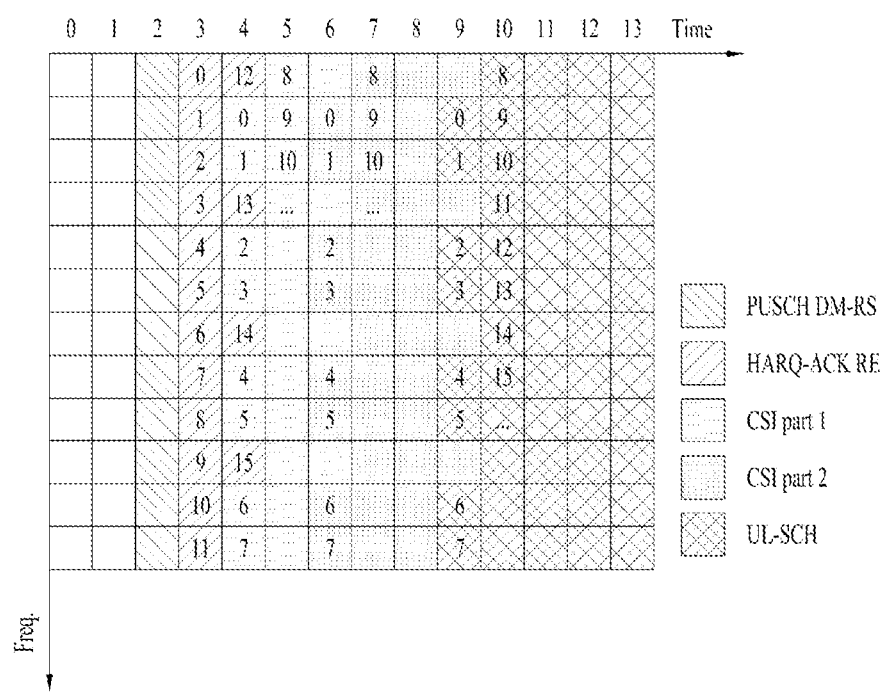
FIG. 6 illustrates exemplary multiplexing of control information in a PUSCH.

FIG. 6 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

1. Wireless Communication System Supporting Unlicensed Band

Figure 7:
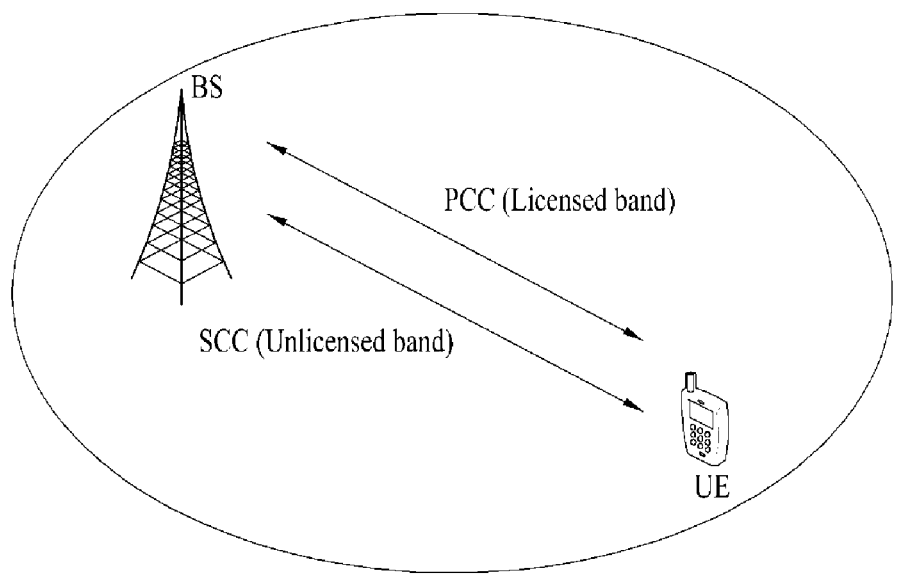
FIG. 7 illustrates a wireless communication system supporting an unlicensed band.
Figure 7:
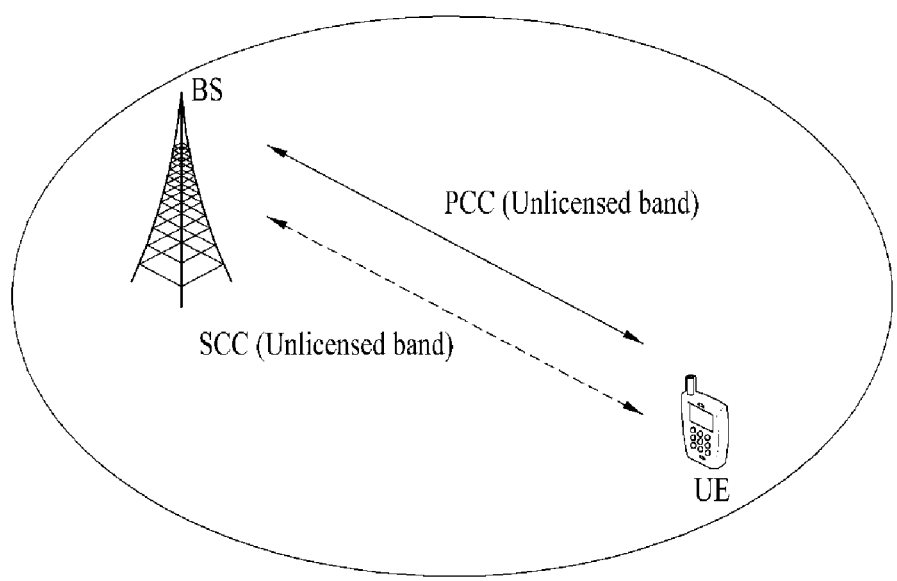

FIG. 7 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 7(a), the LCC may be configured as a primary CC (PCC) and the UCC may be configured as a secondary CC (SCC). As illustrated in FIG. 7(b), the UE and the BS may transmit and receive signals in one UCC or a plurality of carrier-aggregated UCCs. That is, the UE and the BS may transmit and receive signals only in UCC(s) without an LCC.

Unless otherwise specified), a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered the use of an unlicensed band for cellular communication as in License-Assisted Access (LAA) of the legacy 3GPP LTE system. However, unlike the LAA, a NR cell in the unlicensed-band (NR U-cell) aims to support standalone operation. For example, PUCCH, PUSCH, and/or PRACH transmission may be supported in the NR UCell.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

Figure 8:
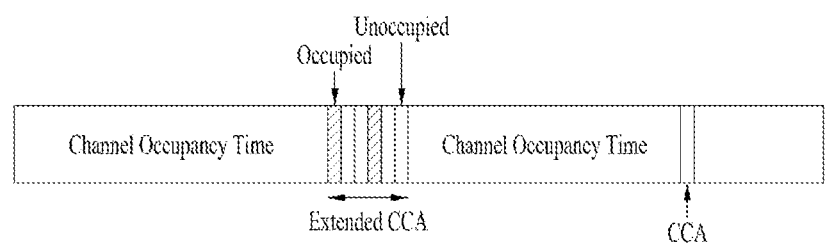
FIG. 8 illustrates an exemplary method of occupying resources in an unlicensed band.

FIG. 8 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of Transmitting DL Signal in Unlicensed Band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP Method

Figure 9:
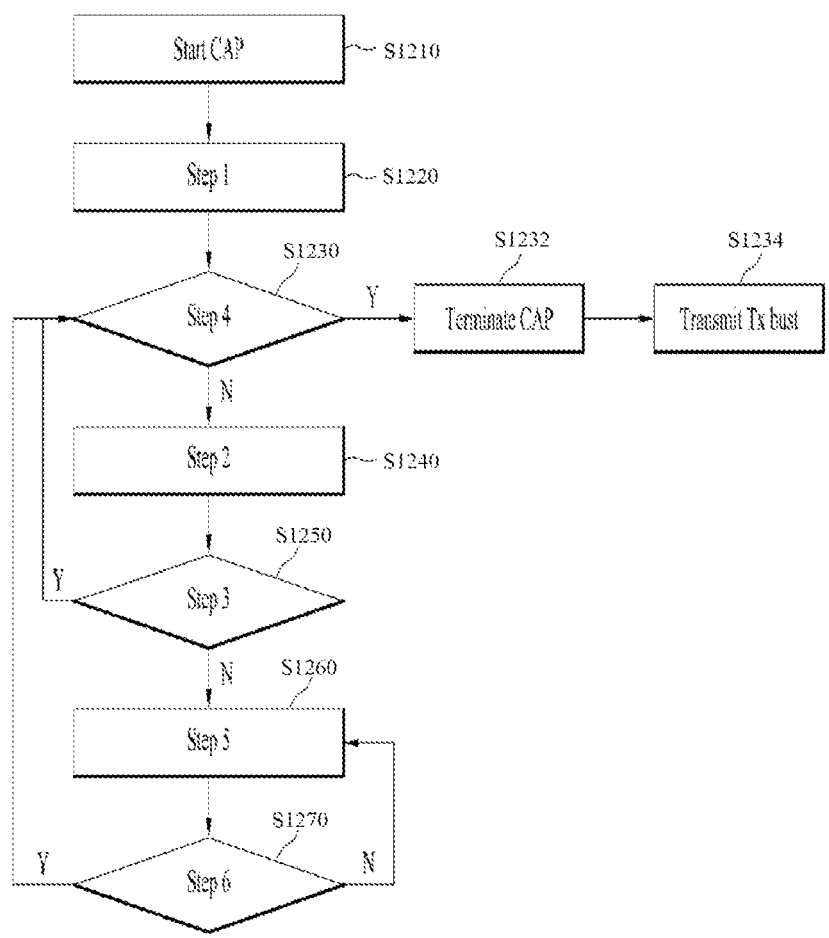
FIGS. 9 and 10 are flowcharts illustrating channel access procedures (CAPs) for signal transmission in an unlicensed band.

FIG. 9 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250), If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration $T_d$ (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cells) is idle during a new defer duration by performing step S1260 again.

Table 3 illustrates that $m_p$, a minimum CW, a maximum CW, a maximum channel occupancy time (MCOT), and an allowed CW size applied to a CAP vary according to channel access priority classes.

TABLE 3

| Channel Access Priority Class (p) | $m_p$ | $CW_{min, p}$ | $CW_{max, p}$ | $T_{mcotp}$ | Allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TV) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. $T_{drs}$ includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 10:
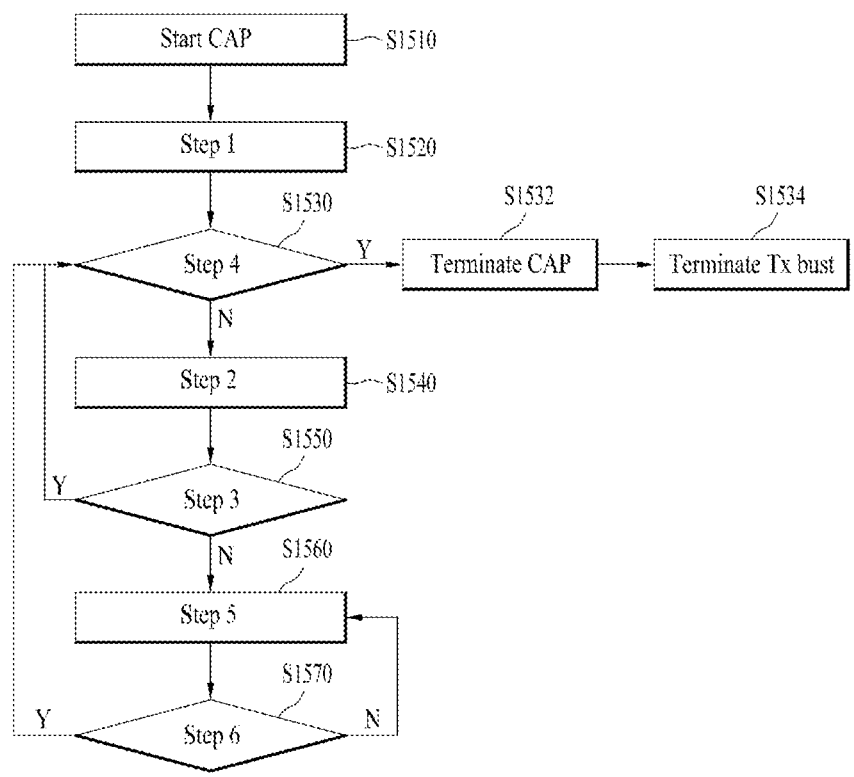

FIG. 10 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value Nina (S1520). Nina may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration $T_d$ (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of $m_p$, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min, p}$ | $CW_{max, p}$ | $T_{ulmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min, p}$ for every priority class p∈{1,2,3,4}. Otherwise, the UE may increase $CW_p$ for every priority class p∈{1,2,3, 4} to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1$, ... $n_w$, starting from the subframe (or slot) no without a gap (the subframe (or slot) $n_w$ is the most recent subframe (or slot) before a subframe (or slot) $n_g$-3 in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

HARQ-ACK Transmission in Unlicensed Band

To support a stand-alone operation in a U-band, a UE operation of transmitting an HARQ-ACK feedback in the U-band based on a PUCCH/PUSCH transmission, in response to a DL data (e.g., PDSCH) reception may be essential (hereinafter, HARQ-ACK is referred to as A/N, for convenience).

For example, the BS may schedule a PDSCH transmission for the UE in a COT occupied by performing LBT (CCA) and indicate to the UE to transmit an A/N feedback for the PDSCH reception in the same COT (or in a gNB-initiated COT starting with/occupied for a DL transmission of the BS). This operation is referred to as intra-COT A/N transmission.

In another example, because of a UE processing time required for decoding a PDSCH signal and encoding an HARQ-ACK signal for the PDSCH signal, the UE may transmit an A/N feedback in response to reception of a PDSCH scheduled/transmitted in a COT, in another COT (or a period which does not belong to a gNB-initiated COT starting with/occupied for a DL transmission of the BS) following the COT may be indicated. This operation is referred to as inter-COT A/N transmission.

Methods of indicating A/N (PUCCH/PUSCH} transmission parameters in consideration of an LBT operation and a COT configuration in a U-band and an A/N transmission type (e.g., intra-COT A/N or inter-COT A/N) changing according to the LBT operation and the COT configuration, and related UE operations will be proposed below. The proposed methods are applicable in a similar manner, to an operation or process of transmitting UCI (e.g., CSI or SR) on a PUCCH/PUSCH, not limited to an operation of transmitting an HARQ-ACK feedback on a PUCCH/PUSCH. Further, the proposed methods described below are applicable in a similar manner, to an L-band (or U-band) operation without LBT, not limited to a U-band operation based on LBT.

Methods of configuring/transmitting an A/N feedback will be described below.

1) Timing-Based A/N Feedback Method (Hereinafter, Referred to as "t-A/N" Scheme)

A plurality of candidate HARQ (PDSCH-to-A/N) timings may be preconfigured by RRC signaling. One of the candidate HARQ timings may be indicated by (DL grant) DCI. The UE may transmit an A/N feedback for reception of a (plurality of) PDSCH(s) in a plurality of slots corresponding to the total candidate HARQ timing set at the HARQ timing indicated by the DCI. This method of configuring and transmitting an A/N feedback may be referred to as a type-1 A/N codebook.

Alternatively, in addition to the HARQ timing indication, a counter downlink assignment index (counter-DAI) and/or a total-DAI may also be signaled by the DCI. The counter-DAI may indicate the scheduling order of the PDSCH corresponding to the (DL grant) DCI. The total-DAI may indicate the total number of PDSCHs scheduled up to the current time. The UE may transmit A/Ns for PDSCHs corresponding to counter-DAI values from an initial counter-DAI value to the last (received) total-DAI value at the indicated HARQ timing. This method of configuring and transmitting an A/N feedback may be referred to as a type-2 A/N codebook.

2) Pooling-Based A/N Feedback Method (Hereinafter, Referred to as p-A/N Scheme)

Pending of an A/N feedback transmission for a corresponding PDSCH may be indicated by DL grant DCI. Subsequently, transmission of an A/N feedback for a PDSCH corresponding to total DL HARQ process IDs or some specific DL HARQ process ID(s) at a timing configured/indicated by a specific signal (e.g., RRC signaling or DCI) may be indicated by specific DCI (e.g., DL grant DCI, UL grant DCI, or other DCI) (pooling). This method of configuring and transmitting an A/N feedback may be referred to as a type-3 A/N codebook.

Further, when counter-DAI/total-DAI signaling is further configured in the t-A/N scheme which is placed in a switching relationship with the p-A/N scheme, an A/N transmission for a PDSCH corresponding to an HARQ process ID indicated by pooling-indicating DCI may be pooled. Alternatively, a total-DAI value may be indicated by pooling-indicating DCI, and an A/N transmission for a PDSCH corresponding to the indicated total-DAI value may be pooled.

3) Method of Dynamically Switching Between t-A/N Scheme and p-A/N Scheme

Switching between the t-A/N scheme and the p-A/N scheme (e.g., which one between the t-A/N scheme and the p-A/N scheme is used to configure/transmit an A/N feedback) may be indicated by DL grant DCI. A/N pending or A/N pooling for the p-A/N scheme may be indicated by the same DL grant DCI. For example, the same DL grant DCI may further indicate pending or pooling of the A/N feedback transmission.

In another example, switching between the t-A/N scheme and A/N pending for application of the p-A/N scheme may be indicated by DL grant DCI. For example, DL grant DCI may indicate whether to apply the t-A/N scheme or pending of an A/N feedback transmission in the p-A/N scheme. A/N pooling in the p-A/N scheme may be indicated by UL grant DCI or UE (or UE group)-common DCI.

In another example, switching between the t-A/N scheme and A/N pending for application of the p-A/N scheme may be indicated by DL grant DCI including PDSCH scheduling/information (e.g., a resource allocation (RA) and a modulation and coding scheme (MCS)/transport block size (TBS)). For example, DL grant DCI including PDSCH scheduling/information (e.g., an RA and an MCS/TBS) may indicate whether to apply the t-A/N scheme or pending of an AN transmission in the p-A/N scheme. A/N pooling in the p-A/N scheme may be indicated by DL grant DCI without PDSCH scheduling.

4) PDSCH (Slot) Group ID-Based A/N Feedback Method

A current-ID indicating the ID of a slot group to which a slot carrying DCI grant DCI or a corresponding PDSCH belongs may be signaled by the DCI (i.e., the DCI grant DCI). 1) An A/N transmission timing and 2) a feedback-ID indicating the ID of a (DL PDSCH) slot group for which an A/N feedback is to be transmitted may be signaled by A/N triggering DCI. The slot group may be a timing set including a plurality of candidate timing values D_m (m=0, 1, ..., M). Therefore, a slot group to which slot #n belongs may be configured/defined with/by M slots corresponding to slot # (n−D_m) or slot #(n+D_m) (m=0, 1, ..., M). M may be predefined or indicated by the BS.

The UE transmits an A/N feedback for a slot group corresponding to the feedback-ID (or a current-ID signaled/received as a value equal to the feedback-ID) at a time indicated as the A/N transmission timing. For example, A/N triggering DCI (or when the DCI is DL grant DCI, a PDSCH corresponding to the DL grant DCI) may be transmitted/detected in slot #n, indicating K and X where K is an A/N transmission timing and X is a feedback-ID. In this case, the UE may transmit an A/N feedback for a slot group with a slot group ID, X (i.e., a current-ID set to X in the DL grant DCI) in slot #(n+K). When the UE transmits the A/N feedback for the slot group corresponding to the feedback-ID (e.g., slot group ID=X) at a time (e.g., slot #K1) indicated as a first A/N transmission timing, a PDSCH related to a second A/N transmission timing (e.g., slot #K2) may be received in the slot group corresponding to the feedback-ID. In this case, the A/N response for the PDSCH reception may be set as NACK in the A/N feedback transmitted in slot #K1.

When A/N triggering DCI is identical to DL grant DCI (i.e., both a current-ID and a feedback-ID are signaled by the DL grant DCI), the UE may transmit 1) an A/N feedback for a bundling window corresponding to an A/N transmission timing or for a slot group corresponding to the current-ID and 2) an A/N feedback for a slot group corresponding to the feedback-ID, in combination, on one PUCCH/PUSCH at a time indicated as the A/N transmission timing.

Configuration of PUCCH Resources for A/N Transmission

To provide a plurality of LBT attempt opportunities for one PUCCH transmission, PUCCH resources may be configured in the following methods.

A single PUCCH resource may be allocated, and a plurality of candidate starting symbols may be configured for the PUCCH resource. A candidate starting symbol may be replaced by a candidate starting symbol set. In this case, a (minimum) symbol duration D may be configured for the PUCCH resource. When a PUCCH is transmitted for the duration D, starting from the last candidate starting symbol, the index of the last symbol of the PUCCH may be I.

The UE may transmit the PUCCH for the duration D, starting from a starting symbol in which LBT is first successful, among the plurality of candidate starting symbols. Alternatively, the UE may transmit the PUCCH in the starting symbol in which LBT is first successful to the symbol with the symbol index I.

In another method, a plurality of candidate PUCCH resources may be allocated in TDM on the time axis. A candidate PUCCH resource may be replaced by a candidate PUCCH resource set. In this case, the resource index of a candidate PUCCH resources starting from the last starting symbol is defined as J. Alternatively, J may be the resource index of a candidate PUCCH resource ending with the last ending symbol.

The UE may transmit a PUCCH only in one PUCCH resource in which LBT is first successful among the plurality of candidate PUCCH resources. Alternatively, the UE may transmit a single PUCCH (repeatedly) over a plurality of PUCCH resources including the PUCCH resource in which LBT is first successful to the PUCCH resource with the resource index J, among the plurality of candidate PUCCH resources.

Configuration of PUCCH Resources Based on PUCCH Resource Indicator (PRI) and/or HARQ Timing Indicator (HTI)

In the above-described PUCCH resource configuration methods, a plurality of sets of candidate PUCCH resources or candidate starting symbols may be preconfigured by a higher-layer signal (e.g., a system information block (SIB) or RRC signaling). Then, one of the sets may be indicated by a specific field in a PDCCH (e.g., DL grant DCI). The specific field may be a PRI. The PRI may also be called an ACK/NACK resource indicator (AM). While candidate PUCCH resources are mainly described below in relation to the PRI, the following description may also be given by replacing candidate PUCCH resources with candidate starting symbols. The UE may perform one of PUCCH transmission operations described in the foregoing <configuration of PUCCH resources for A/N transmission>, based on an indicated candidate PUCCH resource set.

As described before, the intra-COT A/N transmission operation and the inter-COT A/N transmission operation, or the t-AN feedback scheme and the p-AN feedback scheme may be indicated/changed dynamically. A different number of PUCCH resources/starting symbols may be included in a candidate PUCCH resource set corresponding to each state indicated by the PM field (hereinafter, referred to PRI state). For example, the number of PUCCH resources/starting symbols for each PM state may be set to one of $\{1, A(>1)\}$, one of $\{A(>1), B(>A)\}$, or one of $\{1, A(>1), B(>A)\}$. Additionally, to prevent a mismatch between the UE and the BS regarding configuration of A/N payload and determination of a PUCCH resource/starting symbol in the state where a different number of candidate PUCCH resources are configured for each PRI state, a plurality of DL grant DCIs indicating the same A/N transmission timing may indicate the same number of candidate PUCCH resources. The number of candidate PUCCH resources may be indicated by the PM fields of the DL grant DCIs. Upon receipt of the indications, the UE may operate on the assumption of the same number of candidate PUCCH resources.

A plurality of candidate PUCCH resources in the (same) candidate PUCCH resource set configured for one PM state may have the same PUCCH format and RB allocation (e.g., the number/indexes of RBs) and different starting/ending symbol positions. For example, the plurality of candidate PUCCH resources may be configured (in TDM at the slot level) over a plurality of (contiguous) slots, with one PUCCH resource per slot. Alternatively, the plurality of candidate PUCCH resources may be configured over one or more (contiguous) slots, with a plurality of resources per slot (in TDM at the symbol level). In another example, a plurality of PUCCH starting symbols may be configured (in TDM at the slot level) over a plurality of (contiguous) slots, with one starting symbol per slot. Alternatively, the plurality of PUCCH starting symbols may be configured over one or more (contiguous) slots, with a plurality of starting symbols per slot (in TDM at the symbol level).

In the present disclosure, a relatively small contention window size (CWS)-based or backoff (BO)-less type LBT operation is defined as LBT type A (e.g., no LBT or Cat-2 LBT), and a relatively large CWS-based or BO-based LBT operation is defined as LBT type B (e.g., Cat-4 LBT).

Indicating a UL transmission without LBT by DCI that triggers an A/N feedback transmission is defined as LBT type X. Further, Cat-2 LBT or Cat-4 LBT may be indicated by DCI that triggers an A/N feedback transmission. This operation is defined as LBT type Y.

Additionally, different LBT types may be configured for a plurality of (TDMed) PUCCH resources in the same one candidate PUCCH resource set (particularly, in relation to intra-COT A/N transmission). For example, (when the timing gap between the ending time of a DL transmission and the starting time of a UL (A/N) transmission within a COT is equal to or less than a predetermined value) LBT type A or X may be configured/applied for/to some earliest PUCCH resource(s), and LBT type B or Y may be configured/applied for/to the remaining PUCCH resource(s) among the plurality of candidate PUCCH resources.

Figure 11:
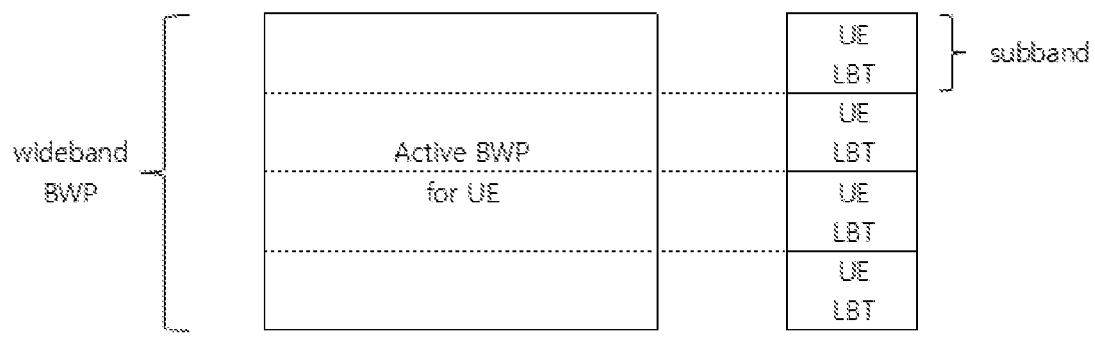
FIGS. 11 and 12 illustrate candidate physical uplink control channel (PUCCH) resources according to an embodiment of the present disclosure.

As illustrated in FIG. 11, one CC or BWP configured for the UE in the U-band situation may be a wideband having a larger BW than in legacy LTE. However, even in this wideband CC/BWP configuration situation, a BW requiring CCA based on an independent LBT operation may be limited (according to a specific rule). Accordingly, a unit subband in which LBT is performed individually is defined as an LBT-SB. A plurality of LBT-SBs may be included (contiguously or non-contiguously) in one wideband CC/BWP.

Based on the above configuration, a plurality of candidate PUCCH resources in time and/or frequency may be indicated/configured (by RRC signaling and/or DCI) in consideration of LBT failure for an A/N PUCCH (and the resulting dropping of the A/N PUCCH transmission) in the U-band situation. The UE may transmit the A/N PUCCH in a specific (one) resource in which LBT is successful among the plurality of candidate PUCCH resources.

Figure 12:
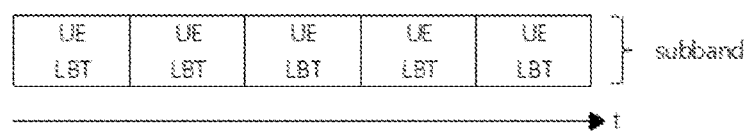

Referring to FIG. 12, a plurality of TDMed candidate PUCCH resources (e.g., a slot or symbol group) (contiguous or non-contiguous) in time may be indicated/configured for transmission of a single A/N PUCCH. These candidate PUCCH resources may be referred to as candidate T-domain resources. The UE may attempt LBT in the plurality of (time) resources sequentially in time, and transmit the A/N PUCCH in a specific resource in which CCA is successful (for the first time).

With reference made again to FIG. 11, a plurality of candidate PUCCH resources (e.g., LBT-SBs, BWPs, or CCs) distinguished by frequency may be indicated/configured for transmission of a single A/N PUCCH. These candidate PUCCH resources may be referred to as candidate F-domain resources. The UE may attempt LBT in the plurality of (frequency) resources (at the same time), and transmit the A/N PUCCH in a specific resource in which CCA is successful.

In relation to an A/N PUCCH transmission, candidate PUCCH resources of which the domain is not explicitly indicated may be candidate T-domain resources in the present disclosure. One candidate T-domain resource may include one or more candidate F-domain resources. A method of allocating A/N PUCCH resources and transmitting an A/N PUCCH, based on candidate T/F-domain resources may be considered. In the following description, a specific field of a PDCCH (e.g., DCI) indicating a PDSCH-to-A/N PUCCH transmission (HARQ) timing may be referred to as an HARQ timing indicator (HTI) field.

In a method of allocating A/N PUCCH resources and transmitting an A/N PUCCH, based on candidate T/F-domain resources, a plurality of candidate T-domain resources may be indicated by a PRI field.

In a method of indicating a plurality of candidate T-domain resources by a PRI field, a candidate PUCCH resource set including (the same number of) a plurality of candidate T-domain resources may be configured for each PRI state. The candidate T-domain resources of the (same) candidate PUCCH resource set configured for one PRI state may have the same PUCCH format and RB allocation (e.g., the number/indexes of RBs), and different starting or ending symbol positions. For example, the plurality of candidate T-domain resources may be configured (in TDM at the slot level) over a plurality of (contiguous) slots, with one resource per slot. Alternatively, the plurality of candidate T-domain resources may be configured over one or more (contiguous) slots, with a plurality of resources per slot (in TDM at the symbol level). Once candidate PUCCH resource set(s) including (the same number of) a plurality of candidate T-domain resources are configured for each PRI state, one HARQ timing may be configured for each HTI state. The HARQ timing indicated by the HTI field may be the transmission timing of the earliest candidate T-domain resource in one candidate PUCCH resource set.

Alternatively, in a method of indicating a plurality of candidate T-domain resources by a PM field, a different number of candidate T-domain resources (in the resource set configured for each PRI state) may be allocated according to an LBT type indicated/configured for an A/N PUCCH transmission. For example, all of a plurality of candidate T-domain resources included in a candidate PUCCH resource set may be allocated for LBT type B or Y. For LBT type A or X, only a specific candidate T-domain resource of the candidate PUCCH resource set may be allocated. The specific candidate T-domain resource may be one earliest candidate T-domain resource.

The UE may transmit the PUCCH only in one of the plurality of allocated candidate T-domain resources, in which the UE has first succeeded in LBT. Alternatively, the UE may transmit the single PUCCH (repeatedly) over a plurality of PUCCH resources from the candidate T-domain resource in which the UE has first succeeded in LBT to a candidate T-domain resource with a resource index J.

In an A/N PUCCH resource allocation and transmission method based on candidate T/F-domain resources, a plurality of candidate T-domain resources may be indicated by the HTI field.

In a method of indicating a candidate T-domain resource by the HTI field, a candidate PUCCH timing set including (the same number of) a plurality of candidate PUCCH timings (e.g., candidate PUCCH starting slot/symbol timings) may be configured for each HTI state. A candidate PUCCH timing set for a reference HTI state may include minimum timings (e.g. {D1, D2, D3, D4}). A candidate PUCCH timing set for an HTI state other than the reference HTI state may be configured by adding the same (e.g., slot or symbol) offset to the minimum timings (e.g., {D1+a, D2+a, D3+a, D4+a}). Different offsets may be configured for the candidate PUCCH timing sets of different HTI states. The plurality of minimum timings (e.g. {D1, D2, D3, D4}) may indicate different (contiguous) slots, respectively. Alternatively, the plurality of minimum timings may indicate a plurality of different symbol timings in each of one or more (contiguous) slots. When a plurality of different symbol timings in each slot are indicated, the starting symbol of a PUCCH resource may be determined based on an indicated symbol timing (e.g., on the assumption that the timing is symbol index 0). When a set of (the same number of) a plurality of candidate PUCCH timings are configured for each HTI state, one (T-domain) PUCCH resource may be configured for each PRI state. The (plurality of) timings of the PUCCH timing set may be applied as the transmission timings of PUCCH resources for the respective PRI states.

Further, in a method of indicating a candidate T-domain resource by the HTI field, a different number of candidate PUCCH timings (in a candidate PUCCH timing set configured for each HTI state) may be applied according to an LBT type indicated/configured for an A/N PUCCH transmission. For example, all of the plurality of candidate PUCCH timings in the candidate PUCCH timing set may be applied for LBT type B or Y. For LBT type A or X, only a specific candidate PUCCH timing of the candidate PUCCH timing set may be applied. The specific candidate PUCCH timing may be one earliest candidate PUCCH timing.

For a plurality of candidate T-domain resources configured by applying a plurality of candidate PUCCH timings to one PUCCH resource, the UE may transmit a PUCCH only in one of the plurality of candidate T domain resources, in which the UE has first succeeded in LBT. Alternatively, the UE may transmit the single PUCCH (repeatedly) over a plurality of PUCCH resources from the PUCCH resource in which the UE has first succeeded in LBT to a PUCCH resource with a resource index J, among the plurality of candidate T-domain resources.

Further, in an A/N PUCCH resource allocation and transmission method based on candidate T/F-domain resources, a plurality of candidate F-domain resources may be indicated by the PRI field.

In a method of indicating a plurality of candidate F-domain resources by a PM field, a candidate PUCCH resource set including a plurality of candidate F-domain resources may be configured for each PRI state. For each PRI state, the number of candidate F-domain resources per candidate PUCCH resource may be the same or different. A plurality of candidate F-domain resources included in the (same) candidate PUCCH resource set of one PM state may have different CC/BWP/LBT-SB configurations, the same PUCCH format, the same RB allocation (in each CC/BWP/LBT-SB), and the same starting and/or ending symbol positions.

Alternatively, in a method of indicating a plurality of candidate F-domain resources by a PM field, a different number of candidate F-domain resources (in the resource set configured for each PRI state) may be allocated according to an LBT type indicated/configured for an A/N PUCCH transmission. For example, all of the plurality of candidate F-domain resources which are included in the candidate PUCCH resource set (and/or located in a gNB-initiated COT in frequency) may be allocated for LBT type Y or B, whereas only a specific candidate F-domain resource among the plurality of candidate F-domain resources which are included in the candidate PUCCH resource set (and/or located in the gNB-initiated COT in frequency) may be allocated for LBT type X or A. The specific candidate F-domain resource may be one candidate F-domain resource located at the lowest frequency.

The UE may attempt LBT in a plurality of allocated candidate F-domain resources (at the same time) and transmit an A/N PUCCH in a specific resource in which the UE succeeds in CCA.

LBT-SB-Based PUCCH Transmission

In the case where a plurality of candidate F-domain resources (e.g., LBT-SBs) are configured for transmission of a single UCI (e.g., A/N) PUCCH, the UE may attempt LBT (at the same time) in the plurality of LBT-SBs and succeed in the LBT for a plurality of LBT-SBs. The UE may transmit the PUCCH (repeatedly on the frequency axis) in (all or some of) the plurality of LBT-SBs. Alternatively, the UE may select a specific one of the plurality of LBT-SBs and transmit the PUCCH only in the selected LBT-SB. Whether the UE is to transmit the PUCCH in a plurality of LBT-SBs or only in one LBT-SB may be determined in consideration of the following.

In the case where a plurality of LBT-SBs are configured for a single PUCCH, the single PUCCH may be transmitted in a plurality of LBT-SBs or a single LBT-SB according to a specific condition. When transmission of another UL channel/signal (e.g. a PUSCH) over a plurality of LBT-SBs (in TDM) in the (contiguous) symbol immediately following the ending symbol of the single PUCCH is indicated/configured to/for the UE, the UE may transmit the PUCCH in the plurality of LBT-SBs which will carry the other UL channel/signal. Alternatively, when a gNB-initiated COT is configured over a plurality of LBT-SBs in frequency, the UE may transmit the PUCCH in the configured plurality of LBT-SBs. The UE may receive a gNB-initiated COT configuration by signaling from the BS or the like. When transmission of another UL channel/signal in a plurality of LBT-SBs is not scheduled, or when a gNB-initiated COT is not configured over a plurality of LBT-SBs in frequency, the UE may transmit the PUCCH in a single LBT-SB.

Alternatively, in the case where a plurality of LBT-SBs are configured for a single PUCCH, whether to transmit the PUCCH in a plurality of LBT-SBs or in a single LBT-SB may be indicated by DCI. For example, DL grant DCI may indicate whether the PUCCH is to be transmitted in a plurality of LBT-SBs or in a single LBT-SB. Alternatively, when DCI indicates use of a single LBT-SB but transmission of another UL channel/signal in a plurality of LBT-SBs is scheduled for the UE, the UE may transmit the PUCCH in the plurality of LBT-SBs which will carry the other UL channel/signal. Further, when DCI indicates use of a single LBT-SB but a gNB-initiated COT is configured over a plurality of LBT-SBs in frequency, the UE may transmit the PUCCH in the configured plurality of LBT-SBs.

Alternatively, in the case where a single LBT-SB is configured for a single PUCCH, the UE may transmit the PUCCH in a plurality of LBT-SBs, exceptionally under a certain condition. For example, when only one LBT-SB is configured for a PUCCH transmission but transmission of another UL channel/signal in a plurality of LBT-SBs is scheduled for the UE, the UE may transmit the PUCCH in the plurality of LBT-SBs which will carry the other UL channel/signal. Further, when only one LBT-SB is configured for a PUCCH transmission but a gNB-initiated COT is configured over a plurality of LBT-SBs in frequency, the UE may transmit the PUCCH in the configured plurality of LBT-SBs.

Channel Transmission Based on NB-CH and WB-CH

It may be generalized that transmission of a specific UL channel/signal (hereinafter referred to as "NB-CH") in one of one or more candidate LBT-SBs is indicated/configured. Transmission of another specific UL channel/signal (hereinafter referred to as "WB-CH") over a plurality of LBT-SBs (in TDM) in the (contiguous) symbol immediately following the ending symbol of the NB-CH may be indicated/configured. When a plurality of candidate LBT-SBs are configured for the NB-CH transmission, the configured LBT-SBs may be identical to the plurality of LBT-SBs allocated for the WB-CH transmission.

In an NB-CH and WB-CH-based channel transmission method, LBT may be first performed for a (plurality of) candidate LBT-SB(s) configured for an NB-CH transmission. When LBT is successful for at least one of the candidate LBT-SBs configured for the NB-CH transmission, an NB-CH is transmitted in the LBT-SB in which LBT is successful. A WB-CH may be transmitted only in the same one LBT-SB. The WB-CH signal may be punctured in the remaining LBT-SBs except for the one LBT-SB, thus not being mapped to the remaining LBT-SBs. Accordingly, the WB-CH signal is not transmitted in the remaining LBT-SBs except for the one LBT-SB. If the LBT fails in all of the candidate LBT-SBs configured for the NB-CH transmission, the UE drops the NB-CH transmission, and performs LBT in the plurality of LBT-SBs configured for the WB-CH transmission. The WB-CH may be transmitted according to LBT results for the plurality of LBT-SBs configured for the WB-CH transmission. For example, the WB-CH may be transmitted only in an LBT-SB in which LBT is successful.

Alternatively, in an NB-CH and WB-CH-based channel transmission method, LBT may be performed for a plurality of LBT-SBs configured for a WB-CH transmission. If the LBT is successful for all of the LBT-SBs, an NB-CH is mapped/transmitted (repeatedly) over the plurality of LBT-SBs in which the LBT is successful. A WB-CH is also transmitted in the plurality of LBT-SBs in which the LBT is successful. If the LBT is successful only in some LBT-SBs, the NB-CH and the WB-CH may be transmitted only in the LBT-SBs in which the LBT is successful. When the LBT fails in all the LBT-SBs, the UE drops the NB-CH transmission and performs LBT for the (same) plurality of LBT-SBs configured for the WB-CH transmission. According to LBT results for the plurality of LBT-SBs configured for the WB-CH transmission, the WB-CH transmission may be performed. For example, the WB-CH transmission may be performed only in an LBT-SB in which LBT is successful. Even when the LBT is successful only in some LBT-SBs, the UE drops the NB-CH transmission and performs only the WB-CH transmission according to the LBT and the LBT results for the (same) plurality of LBT-SBs configured for the WB-CH transmission.

When only a single candidate LBT-SB is indicated/configured for an NB-CH transmission, LBT may be first performed for the candidate LBT-SB configured for the NB-CH transmission. When a plurality of candidate LBT-SBs are indicated/configured for the NB-CH transmission, LBT may first be performed in candidate LBT-SBs configured for a WB-CH transmission.

And/or, when the NB-CH has a higher protection priority than the WB-CH, LBT may be performed first for the candidate LBT-SB configured for the NB-CH transmission. When the WB-CH has a higher protection priority than the NB-CH, LBT may be first performed for the candidate LBT-SBs configured for the WB-CH transmission.

And/or, when it is indicated/configured that the NB-CH transmission takes place later than the WB-CH transmission, LBT may be first performed for the candidate LBT-SB configured for the NB-CH transmission. When it is indicated/configured that the WB-CH transmission takes place later than the NB-CH transmission, LBT may be performed first in the candidate LBT-SBs configured for the WB-CH transmission.

UL TX Parameter Configuration for A/N Transmission

Depending on whether the t-A/N scheme or the p-A/N scheme is indicated by A/N triggering DCI, all or a part of the following UL TX parameters may be configured differently.

(1) Candidate HARQ Timing Set

When the p-A/N scheme is indicated, a minimum candidate HARQ timing may be set to a larger value, and/or the interval between adjacent candidate HARQ timings may be configured/set to be larger than when the t-A/N scheme is indicated.

(2) Candidate PUCCH Starting Symbol Set or Candidate PUCCH Resource Set

When the p-A/N scheme is indicated, a larger number of candidate PUCCH starting symbols or candidate PUCCH resources (e.g., more LBT opportunities) may be configured than when the t-A/N scheme is indicated. For example, in the case of the p-A/N scheme, a plurality of starting symbols or PUCCH resources may be configured, whereas in the case of the t-A/N scheme, a single starting symbol or PUCCH resource may be configured.

(3) LBT type

A. When the p-A/N scheme is indicated, a contention window size (CWS) for BO-based LBT may be set to a larger value than when the t-A/N scheme is indicated. For example, in the case of the p-A/N scheme, a CWS-based BO-based LBT type may be configured. On the other hand, in the case of the t-A/N scheme, a BO-less LBT type may be configured. The BO-based LBT type may be Cat-4 LBT. As the BO-less LBT type, a UL transmission without LBT may be performed (no LBT), or Cat-2 LBT (based on a short CCA gap of 25 us) may be performed.

(4) A/N PUCCH Resource Set

When the p-A/N scheme is indicated, PUCCH resources/formats with a larger maximum supported UCI payload size may be configured/set, and/or PUCCH resources/formats with a larger symbol duration may be configured/set than when the t-A/N scheme is indicated.

In addition, when the p-A/N scheme is indicated, PUCCH resources may be configured only in the form of an RB set discontinuous (e.g., in an equi-distant interlaced structure) in frequency. When the t-A/N scheme is indicated, PUCCH resources may be configured in the form of a (localized) contiguous RB set (in addition to the RB interlaced form).

For the above PUCCH resource allocation, each state indicated by a PM field in DL grant DCI may be set to a different PUCCH resource structure. For example, a specific PM state may be set to the non-contiguous RB set, and another PRI state may be set to the contiguous RB set. With a different PUCCH resource structure configured for each PM state, a PUCCH resource structure may be dynamically indicated/changed by the PM field.

(5) A/N Feedback Type

When inter-COT A/N transmission is indicated, the p-A/N scheme may be applied, and when intra-COT A/N transmission is indicated, the t-A/N scheme may be applied.

Alternatively, in a method of configuring UL TX parameters, all or a part of the following UL TX parameters may be configured differently depending on an LBT type indicated by A/N triggering DCI.

When LBT type A or X is indicated, {t-A/N feedback type, candidate HARQ timing set, candidate PUCCH starting symbol set, A/N PUCCH resource set} corresponding to intra-COT A/N transmission may be applied. When LBT type B or Y is indicated, {p-A/N feedback type, candidate HARQ timing set, candidate PUCCH starting symbol set, A/N PUCCH resource set} corresponding to inter-COT A/N transmission may be applied.

All or a part of the following UL TX parameters may be configured differently depending on an LBT type indicated by A/N triggering DCI (e.g., DL grant DCI, UL grant DCI, or common DCI).

(1) Candidate HARQ Timing Set

When LBT type B or Y is indicated, a minimum candidate HARQ timing may be set to a larger value, and/or the interval between adjacent candidate HARQ timings may be configured/set to be larger than when LBT type A or X is indicated.

(2) Candidate PUCCH Starting Symbol Set or Candidate PUCCH Resource Set

When LBT type B or Y is indicated, a larger number of candidate PUCCH starting symbols or candidate PUCCH resources (e.g., more LBT opportunities) may be set than when LBT type A or X is indicated. For example, when LBT type B or Y is indicated, a plurality of starting symbols or PUCCH resources may be configured, whereas when LBT type A or X is indicated, a single starting symbol or PUCCH resource may be configured.

(3) A/N Feedback Type

When LBT type B or Y is indicated, the p-A/N scheme (or inter-COT A/N transmission) may be applied. When LBT type A or X is indicated, the t-A/N scheme (or intra-COT A/N transmission) may be applied.

(4) A/N PUCCH Resource Set

When LBT type B or Y is indicated, PUCCH resources/formats with a larger maximum supported UCI payload size may be configured/set, and/or PUCCH resources/formats with a larger symbol duration may be configured/set than when LBT type A or X is indicated.

In addition, when LBT type B or Y is indicated, PUCCH resources may be configured only in the form of an RB set discontinuous (e.g., in an equi-distant interlaced structure) in frequency. When LBT type A or X is indicated, PUCCH resources may be configured in the form of a (localized) contiguous RB set (in addition to the RB interlaced form).

For the above PUCCH resource allocation, each state indicated by a PM field in DL grant DCI may be set to a different PUCCH resource structure. For example, a specific PM state may be set to the non-contiguous RB set, and another PRI state may be set to the contiguous RB set. With a different PUCCH resource structure configured for each PM state, a PUCCH resource structure may be dynamically indicated/changed by the PM field.

UL TX Parameter Configuration for PUSCH Transmission

In an example of UL data (e.g., PUSCH) scheduling/transmission, the BS may transmit UL grant DCI that schedules a PUSCH for a specific UE in a COT secured by LBT and indicate to the UE to transmit a PUSCH in the same COT (or a gNB-initiated COT period starting with/occupied for a DL transmission). This operation may be referred to as intra-COT PUSCH transmission.

In another example, the BS may indicate to the UE to transmit a PUSCH corresponding to UL grant DCI transmitted in a specific COT, in another COT (or a period which does not belong to a gNB-initiated COT) following the COT, because of a UE processing time required for decoding a UL grant DCI signal and encoding a corresponding PUSCH signal. This operation may be referred to as inter-COT PUSCH transmission.

According to whether intra-COT PUSCH transmission or inter-COT PUSCH transmission is indicated by UL grant DCI, all or part of the following UL TX parameters may be configured differently.

(1) Candidate HARQ Timing Set

When inter-COT PUSCH transmission is indicated, a minimum candidate HARQ timing may be set to a larger value, and/or the interval between adjacent candidate HARQ timings may be configured/set to be larger than when intra-COT PUSCH transmission is indicated.

(2) Candidate PUCCH Starting Symbol Set or Candidate PUCCH Resource Set

When inter-COT PUSCH transmission is indicated, a larger number of candidate PUCCH starting symbols or candidate PUCCH resources (e.g., more LBT opportunities) may be set than when intra-COT PUSCH transmission is indicated. For example, in the case of the p-A/N scheme, a plurality of starting symbols or PUCCH resources may be configured, whereas in the case of the t-A/N scheme, a single starting symbol or PUCCH resource may be configured.

(3) LBT Type

When inter-COT PUSCH transmission is indicated, a CWS for BO-based LBT may be set to a larger value than when the intra-COT PUSCH transmission is indicated. For example, when the inter-COT PUSCH transmission is indicated, a CWS-based BO-based LBT type may be configured. On the other hand, when the intra-COT PUSCH transmission is indicated, a BO-less LBT type may be configured. The BO-based LBT type may be Cat-4 LBT. As the BO-less LBT type, a UL transmission without LBT (no LBT) or Cat-2 LBT (based on a short CCA gap of 25 us) may be performed.

(4) PUSCH Resource Allocation

When inter-COT PUSCH transmission is indicated, a larger (maximum) PUSCH symbol duration in the time domain may be configured/allocated, and a smaller (minimum) PUSCH resource size in the frequency domain may be configured/allocated than when intra-COT PUSCH transmission is indicated.

In addition, when inter-COT PUSCH transmission is indicated, PUCCH resources may be configured only in the form of an RB set discontinuous (e.g., in an equi-distant interlaced structure) in frequency. When intra-COT PUSCH transmission is indicated, PUCCH resources may be configured in the form of a (localized) contiguous RB set (in addition to the RB interlaced form).

Alternatively, in a method of configuring UL TX parameters, all or part of the following UL TX parameters may be configured differently according to an LBT type indicated by UL grant DCI.

When LBT type A or X is indicated, {candidate HARQ timing set, candidate PUCCH starting symbol set, PUCCH resource allocation} corresponding to intra-COT PUSCH transmission may be applied. When LBT type B or Y is indicated, {candidate HARQ timing set, candidate PUCCH starting symbol set, PUCCH resource allocation} corresponding to inter-COT PUSCH transmission may be applied.

All or a part of the following UL TX parameters may be configured differently depending on an LBT type indicated by UL grant DCI.

(1) Candidate HARQ Timing Set

When LBT type B or Y is indicated, a minimum candidate HARQ timing may be set to a larger value, and/or the interval between adjacent candidate HARQ timings may be configured/set to be larger than when LBT type A or X is indicated.

(2) Candidate PUCCH Starting Symbol Set or Candidate PUCCH Resource Set

When LBT type B or Y is indicated, a larger number of candidate PUSCH starting symbols or candidate PUSCH resources (e.g., more LBT opportunities) may be set than when LBT type A or X is indicated. For example, when LBT type B or Y is indicated, a plurality of starting symbols or PUSCH resources may be configured, whereas when LBT type A or X is indicated, a single starting symbol or PUSCH resource may be configured.

(3) PUSCH Transmission Type (A/N Feedback Type)

When LBT type B or Y is indicated, the inter-COT PUSCH transmission scheme may be applied. When LBT type A or X is indicated, the intra-COT PUSCH transmission scheme may be applied.

(4) PUSCH Resource Allocation

When LBT type B or Y is indicated, a larger (maximum) PUSCH symbol duration in the time domain may be configured/set than when LBT type A or X is indicated. And/or when LBT type B or Y is indicated, a smaller (minimum) PUSCH resource size in the frequency domain may be configured/set than when LBT type A or X is indicated.

In addition, when LBT type B or Y is indicated, PUCCH resources may be configured only in the form of an RB set discontinuous (e.g., in an equi-distant interlaced structure) in frequency. When LBT type A or X is indicated, PUCCH resources may be configured in the form of a (localized) contiguous RB set (in addition to the RB interlaced form).

Alternatively, a UL HARQ timing indicator (U-HTI)-based PUSCH transmission method may be considered. A U-HTI is a specific field in a PDCCH/PDSCH, indicating a UL grant (DCI)-to-PUSCH transmission (HARQ) timing. A specific embodiment of the U-HTI-based PUSCH transmission method will be described below.

In a method of transmitting a PUSCH based on a U-HTI, a candidate PUCCH timing set including (the same number of) a plurality of candidate PUCCH timings (e.g., candidate PUCCH starting slot/symbol timings) may be configured for each U-HTI state. A candidate PUCCH timing set for a reference U-HTI state may include minimum timings (e.g. {E1, E2, E3, E4}). A candidate PUCCH timing set for a U-HTI state other than the reference U-HTI state may be configured by adding the same (e.g., slot or symbol) offset to the minimum timings (e.g., {E1+b, E2+b E3+b, E4+b}). Different offsets may be configured for the candidate PUCCH timing sets of different U-HTI states. The plurality of minimum timings (e.g. {E1, E2, E3, E4}) may indicate different (contiguous) slots. Alternatively, the plurality of minimum timings may indicate a plurality of different symbol timings in each of one or more (contiguous) slots.

Alternatively, in a method of transmitting a PUSCH based on a U-HTI, a different number of candidate PUSCH timings (in the candidate PUSCH timing set configured for each U-HTI state) may be applied according to an LBT type indicated/configured for a PUSCH transmission. For example, all of the plurality of candidate PUSCH timings in the candidate PUSCH timing set may be applied for LBT type B or Y. For LBT type A or X, only a specific candidate PUSCH timing of the candidate PUSCH timing set may be applied. The specific candidate PUSCH timing may be one earliest candidate PUSCH timing.

Configuration of a Plurality of Candidate Resources for SRS and PRACH Transmission To provide a plurality of LBT attempt opportunities for one SRS transmission in a U-band operation situation, various methods of configuring SRS resources and transmitting an SRS from a UE in the SRS resources based on LBT will be proposed below.

A plurality of candidate SRS resources or a plurality of candidate SRS resource sets, which are multiplexed in TDM on the time axis, may be allocated to the UE. The resource index of a candidate SRS resource starting from (or ending in) the last starting (or ending) symbol is defined as a resource index Y. The UE may transmit an SRS only in one SRS resource in which the UE has first succeeded in LBT among the plurality of candidate SRS resources. Alternatively, the UE may transmit the single SRS (repeatedly) over a plurality of SRS resources from the SRS resource in which the UE has first succeeded in LBT to the SRS resource with the resource index Y, among the plurality of candidate SRS resources.

Specifically, in the above-described SRS resource configuration methods, a plurality of sets of candidate SRS resources or candidate starting symbols may be preconfigured by a higher-layer signal (e.g., an SIB or RRC signaling). Then, one of the sets may be indicated by a specific field in a PDCCH (e.g., DL grant DCI). The specific field may be an SRS resource indicator (SRI) field. While candidate SRS resources are mainly described below in relation to the SRI, the following description may also be interpreted by replacing candidate SRS resources with candidate starting symbols. The UE may perform one of the above-described SRS transmission operations based on an indicated candidate SRS resource set.

As described before, the intra-COT A/N transmission operation and the inter-COT A/N transmission operation may be indicated/changed dynamically. A different number of SRS resources may be included in a candidate SRS resource set corresponding to each state indicated by the SRI field (hereinafter, referred to as SRI state). For example, the number of SRS resources for each PRI state may be set to one of {1, C(>1)}, one of {C(>1), D(>A)}, or one of {1, C(>1), D(>C)}.

A plurality of candidate SRS resources in the (same) candidate SRS resource set configured for one SRI state may have the same RB allocation (e.g., the number/indexes of RBs) and different starting/ending symbol positions. For example, the plurality of candidate SRS resources may be configured (in TDM at the slot level) over a plurality of (contiguous) slots, with one SRS resource per slot. Alternatively, the plurality of candidate SRS resources may be configured over one or more (contiguous) slots, with a plurality of resources per slot (in TDM at the symbol level). In another example, a plurality of SRS starting symbols may be configured (in TDM at the slot level) over a plurality of (contiguous) slots, with one starting symbol per slot. Alternatively, the plurality of SRS starting symbols may be configured over one or more (contiguous) slots, with a plurality of starting symbols per slot (in TDM at the symbol level).

Additionally, different LBT types may be configured for a plurality of (TDMed) SRS resources in the same one candidate SRS resource set (particularly, in relation to intra-COT A/N transmission). For example, (when the timing gap between the ending time of a DL transmission and the starting time of a UL (SRS) transmission within a COT is equal to or less than a predetermined value) LBT type A or X may be configured/applied for/to transmission of some earliest SRS resource(s), and LBT type B or Y may be configured/applied for/to transmission of the remaining SRS resource(s) among the plurality of candidate PUCCH resources.

The SRS transmission method described in the present disclosure is applicable in a similar manner, to an operation of indicating a PRACH transmission to a UE (based on a configuration of a plurality of candidate resources) by a PDCCH/PDSCH. Specifically, the same embodiment may be implemented by replacing 1) SRS resources (or starting symbols) with PRACH resources (or starting symbols) and 2) an SRI field (in a PDCCH (e.g., DCI)) with a PRACH resource indicator (RRI) field.

One CC or BWP configured for the UE in the U-band situation may be configured to be a wideband having a larger BW than in legacy LTE. However, even in this wideband CC/BWP configuration situation, a BW requiring CCA based on an independent LBT operation may be limited (according to a specific rule). As described before, a unit subband in which LBT is performed individually is defined as an LBT-SB. A plurality of LBT-SBs may be included (contiguously or non-contiguously) in one wideband CC/BWP. Based on the above configuration, a plurality of candidate SRS resources in time and/or frequency may be indicated/configured (by RRC signaling and/or DCI) in consideration of LBT failure for an SRS (and the resulting dropping of the SRS transmission) in the U-band situation. The UE may transmit the SRS in a specific (one) resource in which LBT is successful among the plurality of candidate SRS resources.

A plurality of TDMed candidate SRS resources (e.g., a slot or symbol group) in time may be indicated/configured for transmission of a single SRS. These candidate SRS resources may be referred to as candidate T-domain resources. The UE may attempt LBT in the plurality of (time) resources sequentially in time, and transmit the SRS in a specific resource in which CCA is successful (for the first time). Alternatively, a plurality of candidate SRS resources (e.g., LBT-SBs, BWPs, or CCs) distinguished by frequency may be indicated/configured for transmission of a single SRS. These candidate SRS resources may be referred to as candidate F-domain resources. The UE may attempt LBT in the plurality of (frequency) resources (at the same time), and transmit the SRS in a specific resource in which CCA is successful.

In relation to an SRS transmission, candidate SRS resources of which the domain is not explicitly indicated may be candidate T-domain resources in the present disclosure. One candidate T-domain resource may include one or more candidate F-domain resources. A method of allocating SRS resources and transmitting an SRS, based on candidate T/F-domain resources may be considered. In the following description, a specific field of a PDCCH (e.g., DCI) indicating a PDSCH-to-SRS transmission (HARD) timing may be referred to as an SRS timing indicator (STI) field.

In a method of allocating SRS resources and transmitting an SRS, based on candidate T/F-domain resources, a plurality of candidate T-domain resources may be indicated by an SRI field.

In a method of indicating a plurality of candidate T-domain resources by an SRI field, a candidate SRS resource set including (the same number of) a plurality of candidate T-domain resources may be configured for each SRI state. The candidate T-domain resources of the (same) candidate SRS resource set configured for one SRI state may have the same RB allocation (e.g., the number/indexes of RBs), and different starting or ending symbol positions. For example, the plurality of candidate T-domain resources may be configured (in TDM at the slot level) over a plurality of (consecutive) slots, with one resource per slot. Alternatively, the plurality of candidate T-domain resources may be configured over one or more (consecutive) slots, with a plurality of resources per slot (in TDM at the symbol level). Once candidate SRS resource set(s) including (the same number of) a plurality of candidate T-domain resources are configured for each SRI state, one SRS timing may be configured for each STI state. The SRS timing indicated by the STI field may be the transmission timing of the earliest candidate T-domain resource in one candidate SRS resource set.

Alternatively, in a method of indicating a plurality of candidate T-domain resources by an SRI field, a different number of candidate T-domain resources (in the resource set configured for each SRI state) may be allocated according to an LBT type indicated/configured for an SRS transmission. For example, all of a plurality of candidate T-domain resources included in a candidate SRS resource set may be allocated for LBT type B or Y. For LBT type A or X, only a specific candidate T-domain resource of the candidate SRS resource set may be allocated. The specific candidate T-domain resource may be one earliest candidate T-domain resource.

The UE may transmit the SRS only in one of a plurality of allocated candidate T-domain resources, in which the UE has first succeeded in LBT. Alternatively, the UE may transmit the single SRS (repeatedly) over a plurality of SRS resources from the candidate T-domain resource in which the UE has first succeeded in LBT to a candidate T-domain resource with a resource index Y.

Further, in an A/N PUCCH resource allocation and transmission method based on candidate T/F-domain resources, a plurality of candidate T-domain resources may be indicated by the STI field.

In a method of indicating a candidate T-domain resource by an STI field, a candidate SRS timing set including (the same number of) a plurality of candidate SRS timings (e.g., candidate SRS starting slot/symbol timings) may be configured for each STI state. A candidate SRS timing set for a reference STI state may include minimum timings (e.g. {F1, F2, F3, F4}). A candidate SRS timing set for an HTI state other than the reference STI state may be configured by adding the same (e.g., slot or symbol) offset to the minimum timings (e.g., {F1+c, F2+c, F3+c, F4+c}). Different offsets may be configured for the candidate SRS timing sets of different HTI states. The plurality of minimum timings (e.g. {F1, F2, F3, F4}) may indicate different (contiguous) slots. Alternatively, the plurality of minimum timings may indicate a plurality of different symbol timings in each of one or more (contiguous) slots. When a plurality of different symbol timings in each slot are indicated, the starting symbol of an SRS resource may be determined based on an indicated symbol timing (e.g., on the assumption that the timing is symbol index 0). When a set of (the same number of) a plurality of candidate SRS timings are configured for each STI state, one (T-domain) SRS resource may be configured for each SRI state. The (plurality of) timings of the SRS timing set may be applied as the transmission timings of SRS resources for the respective SRI states.

Further, in a method of indicating a candidate T-domain resource by an STI field, a different number of candidate SRS timings (in the candidate SRS timing set configured for each STI state) may be applied according to an LBT type indicated/configured for an SRS transmission. For example, all of the plurality of candidate SRS timings in the candidate SRS timing set may be applied for LBT type B or Y. For LBT type A or X, only a specific candidate SRS timing of the candidate SRS timing set may be applied. The specific candidate SRS timing may be one earliest candidate SRS timing.

For a plurality of candidate T-domain resources configured by applying a plurality of candidate SRS timings to one SRS resource, the UE may transmit an SRS only in one of the plurality of candidate T domain resources, in which the UE has first succeeded in LBT. Alternatively, the UE may transmit the single SRS (repeatedly) over a plurality of SRS resources from the SRS resource in which the UE has first succeeded in LBT to an SRS resource with a resource index Y, among the plurality of candidate T-domain resources.

Further, in an SRS resource allocation and transmission method based on candidate T/F-domain resources, a plurality of candidate F-domain resources may be indicated by the SRI field.

In a method of indicating a plurality of candidate F-domain resources by an SRI field, a candidate SRS resource set including a plurality of candidate F-domain resources may be configured for each SRI state. For each SRI state, the number of candidate F-domain resources per candidate SRS resource may be the same or different. A plurality of candidate F-domain resources included in the (same) candidate SRS resource set of one PM state may have different CC/BWP/LBT-SB configurations, the same RB allocation (in each CC/BWP/LBT-SB), and the same starting and/or ending symbol positions.

Alternatively, in a method of indicating a plurality of candidate F-domain resources by an SRI field, a different number of candidate F-domain resources (in the resource set configured for each PRI state) may be allocated according to an LBT type indicated/configured for an SRS transmission. For example, all of the plurality of candidate F-domain resources which are included in the candidate SRS resource set (and/or located in a gNB-initiated COT in frequency) may be allocated for LBT type Y or B, whereas only a specific candidate F-domain resource among the plurality of candidate F-domain resources which are included in the candidate SRS resource set (and/or located in the gNB-initiated COT in frequency) may be allocated for LBT type X or A. The specific candidate F-domain resource may be one candidate F-domain resource located at the lowest frequency.

The UE may attempt LBT in a plurality of allocated candidate F-domain resources (at the same time) and transmit an A/N SRS in a specific resource in which the UE succeeds in CCA.

As described above, the methods of indicating a plurality of candidate T-domain/F-domain resources by an SRI field are applicable to a PRACH transmission of a UE in a similar manner. Specifically, the same embodiment may be implemented by replacing 1) (T-domain/F-domain) SRS resources with (T-domain/F-domain) PRACH resources, 1) an SRI field (in a PDCCH (e.g., DCI)) with an RRI field, 3) an STI field (in a PDCC/DCI) with a PDCCH-to-PRACH timing indicator (RTI) field, and 4) an SRS timing (or starting slot/symbol) with a PRACH timing (or starting slot/symbol).

Overlap Between A/N Feedback and (PUCCH) Transmission

The UE may be indicated to transmit an A/N for the same one PDSCH (at different time points) based on both of the t-A/N scheme and the p-A/N scheme. In this case, the UE may transmit the A/N for the PDSCH 1) based on the two A/N schemes, 2) only at a time when LBT is first successful in either of the two A/N schemes, or 3) only in the p-A/N scheme. Further, the A/N transmission timings of two A/N (e.g., p-A/N) feedbacks triggered at different time points may overlap with each other (due to failure of LBT for the earlier triggered A/N feedback transmission). In this case, (with respect to the overlapped time point) the UE may transmit 1) the later (or earlier) triggered A/N (e.g., p-A/N) feedback, or 2) an A/N (e.g., p-A/N) feedback corresponding to more (CCs and/or) HARQ process IDs or a larger total-DAI value.

When an A/N feedback operation (e.g., dynamic switching between the t-A/N scheme and the p-A/N scheme) is applied based on DAI signaling, a mismatch may occur between the BS and the UE, regarding a correct A/N feedback transmission/reception time in a state where the DAI signaling (e.g., by a modulo operation) is performed in a limited number of bits.

Figure 13:
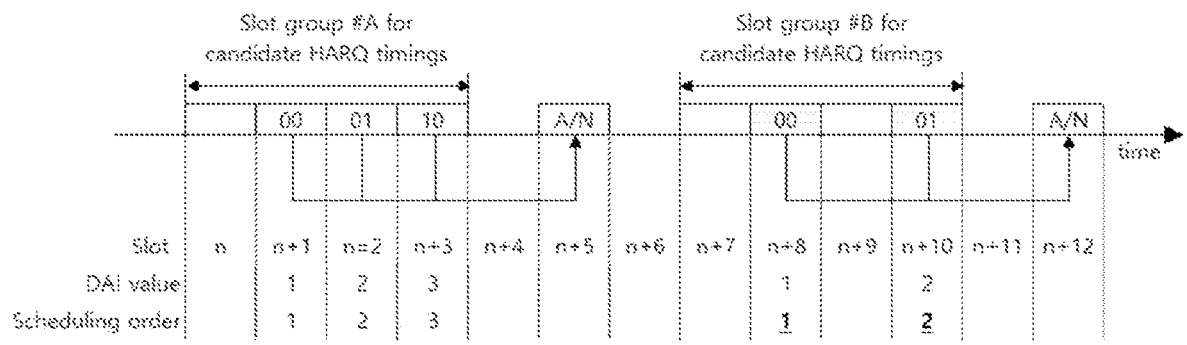
FIGS. 13 to 15 illustrate exemplary downlink assignment index (DAI) sequences according to an embodiment of the present disclosure.
Figure 13:
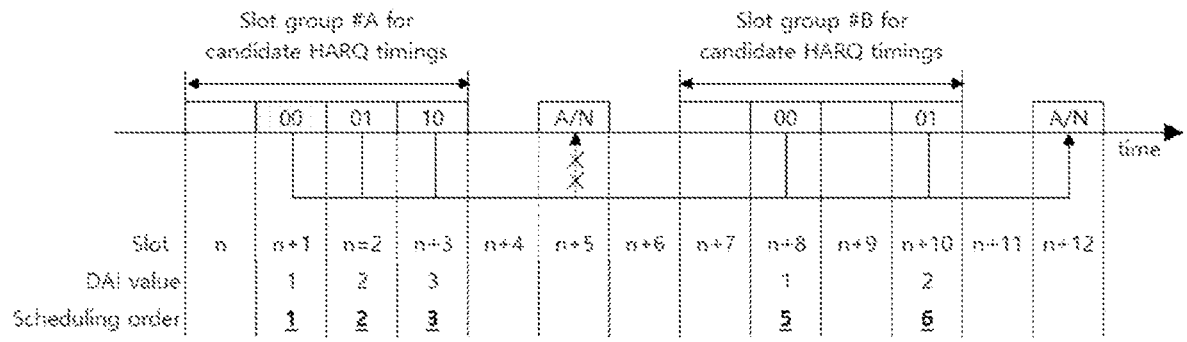

FIG. 13 illustrates an A/N mismatch in a DAI-based A/N feedback process.

For the operation of FIG. 13, the t-A/N scheme may be referred to. For example, the BS may preconfigure a plurality of candidate HARQ timings by RRC signaling and then indicate one of the candidate HARQ timings to the UE by (DL grant DCI). Accordingly, when an A/N transmission in slot #m is indicated, A/N information may include response information for a PDSCH reception in slot #(m-i). Slot #(m-i) corresponds to a candidate HARQ timing. FIG. 13 illustrates candidate HARQ timings with i={2, 3, 4, 5}. (DL grant) DCI may signal a DAI together with an HARQ timing indicator. The DAI may represent a modulo value of a scheduling order. For example, it is assumed that the DAI is m-bit (e.g., 2-bit) information ranging from 1 to $2^m$, and the scheduling order starts from 1. In this case, the DAI value may correspond to [scheduling order mod $2^m$].

When the DAI value is 00 (e.g., DAI value=1), this indicates 4n+1 (i.e., 1, 5, 9, . . . ).
When the DAI value is 01 (e.g., DAI value=3), this indicates 4n+2 (i.e., 2, 6, 10, . . . ).
When the DAI value is 10 (e.g., DAI value=3), this indicates 4n+3 (i.e., 3, 7, 11, . . . ).
When the DAI value is 11 (e.g., DAI value=4), this indicates 4n+4 (i.e., 4, 8, 12, . . . ).
n is an integer equal to or larger than 0.

On the assumption that the DAI has a value ranging from 0 to $2^m-1$, the DAI value may be represented as [(scheduling order mod $2^m$)−1]

The DAI may specify the scheduling order of a PDSCH or the scheduling order of a PDCCH/DCI. Further, the DAI may include a c-DAI and/or a t-DAI.

FIG. 13(a) illustrates successful transmission of an A/N feedback for slot group #A at a UE (e.g., LBT success). An A/N feedback in slot #(n+5) is generated based on a DAI sequence (i.e., DAI=1/2/3) (slot #n+1/#n+2/#n+3). Subsequently, the UE may be requested to transmit a new A/N feedback in slot #(n+12). In this case, the UE may generate an A/N feedback based on a DAI sequence (i.e., DAI=½) (slot group #A; slot #n+8/#n+10) starting after transmission of the previous A/N feedback. For example, A/N information/bits may be arranged in an A/N feedback according to the sequence of DAI values. Further, the size of the A/N feedback may be determined based on the last value of a scheduled DAI or the number of candidate HARQ timings. The A/N feedback includes A/N payload or an A/N codebook.

FIG. 13(b) illustrates failure of an A/N feedback transmission for slot group #A at a UE (e.g., LBT failure). An A/N feedback in slot #(n+5) may be retransmitted in a next A/N transmission opportunity. For example, when an A/N feedback transmission in slot #(n+12) is requested, the UE may generate an A/N feedback based on a DAI sequence (i.e., DAI=1/2/3/4/1/2) starting from a time point (e.g., slot group #A) corresponding to the previous A/N feedback. Because of the absence of a PDSCH reception corresponding to DAI=4, the UE may set an A/N corresponding to DAI=4 as NACK in the A/N feedback in slot #(n+12).

Figure 16:
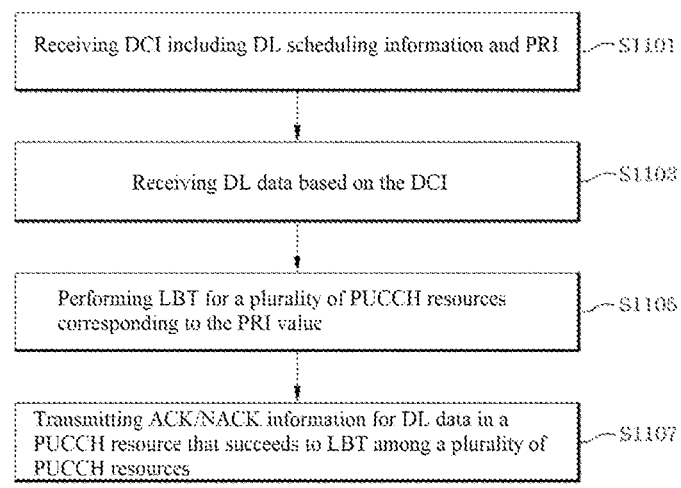
FIGS. 16 and 17 are flowcharts according to an embodiment of the present disclosure.

In the U-band, an A/N feedback may be failed for various reasons in view of the nature of the unlicensed band. For example, as illustrated in FIG. 16, the UE may drop/defer an A/N feedback due to LBT failure. Moreover, although the UE has succeeded in transmitting an A/N feedback after LBT success, the BS may fail in receiving/detecting the A/N feedback. Therefore, there may be ambiguity (between the UE and the BS) about a time from which a set of DAI values (e.g., a DAI sequence) corresponding to an indicated A/N feedback starts, thereby causing a mismatch in A/N codebook configuration/size between the UE and the BS.

To avert the above problem, a method of including an indicator (a DAI sequence flag (DSF)) in DL grant DCI that schedules a PDSCH and/or DCI that triggers an A/N transmission (based on a p-A/N feedback) may be considered. The DSF may be used to indicate a DAI sequence to which a DAI corresponding to a current scheduled/transmitted PDSCH and/or a DAI for a current triggered A/N feedback belongs. The DSF may be configured in one bit. In this case, the DSF may indicate whether the DAI corresponding to the current scheduled/transmitted PDSCH and/or the DAI for the current triggered A/N feedback belongs to a DAI sequence "0" or "1". When the DSF is configured in one bit, the DSF may be signaled in a toggled form. For example, when a DSF value toggled from a DSF value received in previous (recent) DCI is indicated by current DCI, the DAI sequence "0" may be indicated. On the other hand, when a non-toggled DSF value from the DSF value received in the previous (recent) DCI is indicated by the current DCI, the DAI sequence "1" may be indicated. The DAI sequence "0" may correspond to the DAI sequence (i.e., DAI=½) of FIG. 16(a) (see slot group #A; slot #n+8/#n+10), and the DAI sequence "1" may correspond to the DAI sequence (i.e., DAI=1/2/3/4/1/2) of FIG. 13(b) (see slot group #A/#B).

Figure 14:
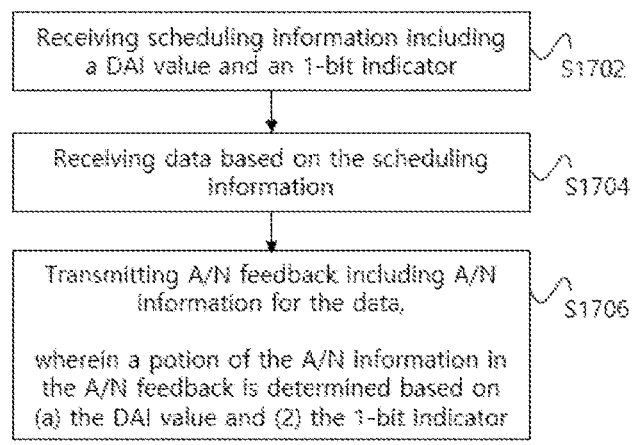

FIG. 14 illustrates an A/N feedback process according to the present disclosure. Referring to FIG. 14, the UE may receive scheduling information including a DAI value and a 1-bit indicator (S1702). The DAI value may represent a modulo value of a scheduling order. For example, the DAI value may be given as [scheduling order mod 4]. The scheduling order may be the scheduling order of a PDSCH or the scheduling order of a PDCCH/DCI. The UE may then receive data based on the scheduling information (S1704). Subsequently, the UE may transmit an A/N feedback including A/N information for the data (S1706). The A/N feedback includes A/N payload or an A/N codebook. The A/N feedback may be transmitted on a PUCCH or a PUSCH.

The position of the A/N information in the A/N feedback may be determined based on (1) the DAI value and (2) whether the bit value of the 1-bit indicator has been toggled. For example, the A/N feedback is configured based on one of two DAI sequences, which is determined according to the bit value of the 1-bit indicator or whether the bit value of the 1-bit indicator has been toggled, and the DAI value may indicate a scheduling order based on the determined DAI sequence. For example, the A/N information/bit may be arranged in the A/N feedback according to the order of the DAI value. The size of the A/N feedback may be determined based on the last value of the scheduled DAI or the number of candidate HARQ timings.

One of the two DAI sequences, a first DAI sequence may correspond to a 1-bit indicator having a bit value of 0 (or 1) or a toggled value, and include a first number of DAI values. On the other hand, the other DAI sequence, a second DAI sequence may correspond to a 1-bit indicator having a bit value of 1 (or 0) or a non-toggled value, and include a second number of DAI values. The first number may be smaller than the second number.

The DAI may indicate the scheduling order of the data within a time window. In this case, the first DAI sequence between the two DAI sequences may correspond to the 1-bit indicator having a bit value of 0 (or 1) or a toggled value, and may correspond to a time window starting from a first time point. On the other hand, the second DAI sequence may correspond to the 1-bit indicator having a bit value of 1 (or 0) or a non-toggled value, and may correspond to a time window starting from a second time point. The first time point may be later than the second time point.

Based on the 1-bit indicator having been toggled, the DAI value may indicate the scheduling order of only data after the previous A/N feedback. On the other hand, based on the 1-bit indicator having not been toggled, the DAI value may indicate the scheduling order of (i) data related to the previous A/N feedback, and (ii) the data after the A/N feedback.

Based on the 1-bit indicator having been toggled, the A/N feedback may indicate only a data reception state after the previous A/N feedback. On the other hand, based on the 1-bit indicator having not been toggled, the A/N feedback may indicate (i) the previous A/N feedback and (ii) the data reception state after the A/N feedback.

The transmission of the A/N feedback may be performed according to an LBT result.

Figure 15:
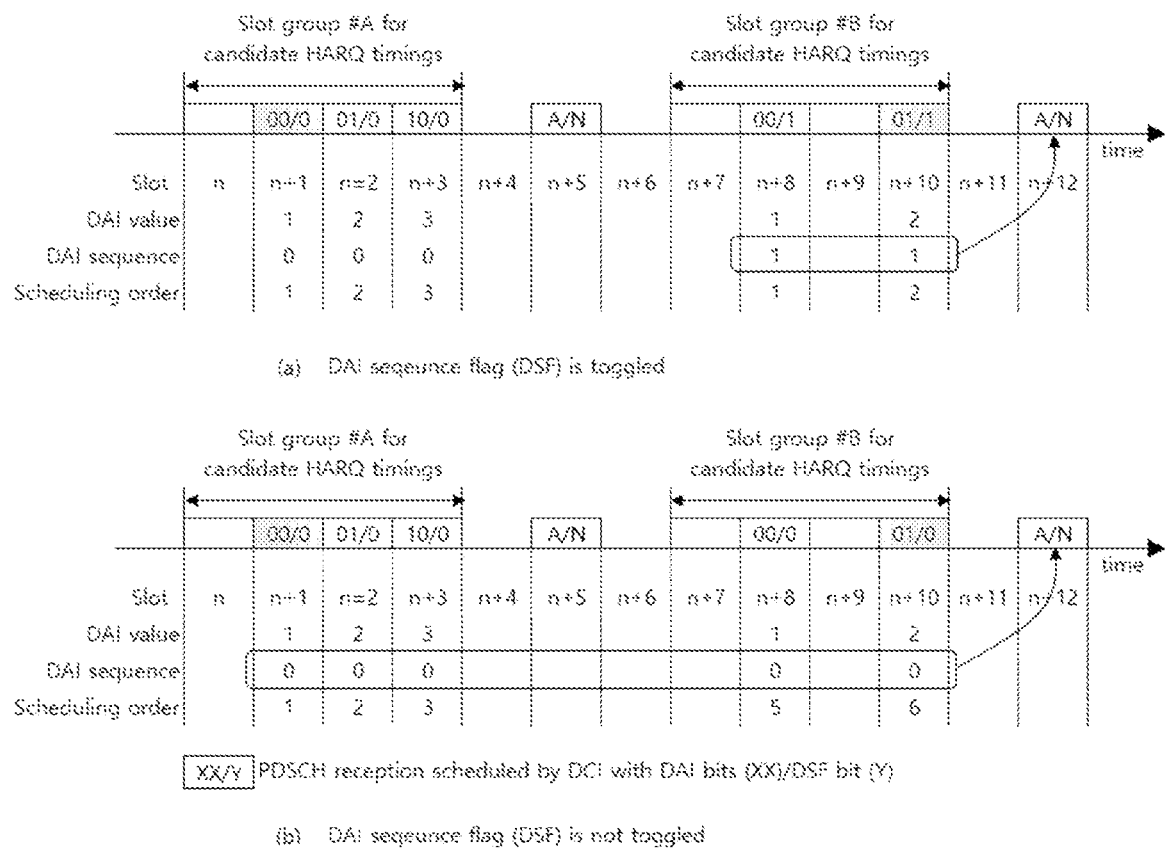

FIG. 15 illustrates an A/N feedback according to the present disclosure. The basic situation is the same as in FIG. 13. Accordingly, the description of FIG. 13 may be referred to for basics.

Referring to FIG. 15(a), the UE may receive a PDSCH in slot #(n+8)/#(n+10). The PDSCH of slot #(n+8) is scheduled by DCI having a first DAI of 00 and a first DSF of 1, and the PDSCH of slot #(n+10) may be scheduled by DCI with a second DAI of 01 and a second DSF of 1. Since the value of the first DSF has been toggled from the DSF value of the previous DCI (e.g., DCI scheduling the PDSCH of slot #(n+3)), the first DAI belongs to a DAI sequence different from the previous DAI sequence. For example, the first DAI may belong to a DAI sequence (e.g., the DAI sequence of 1) starting in slot group #B. In addition, since the value of the second DSF of 1 has not been toggled from the value of the first DSF, the second DAI belongs to the same DAI sequence as the previous DAI sequence (i.e., the DAI sequence 1). Thereafter, the UE may transmit an A/N feedback generated based on the DAI sequence 1 in slot #(n+12). Specifically, the UE may generate the A/N feedback based on the DAI sequence starting after transmission of the previous A/N feedback (i.e., DAI=½) (see slot group #A; slot #n+8/#n+10).

Referring to FIG. 15(b), the UE may receive a PDSCH in slot #(n+8)/#(n+10). The PDSCH of slot #(n+8) is scheduled by DCI having a first DAI of 00 and a first DSF of 0, and the PDSCH of slot #(n+10) is scheduled by DCI having a second DAI of 01 and a second DSF of 0. The first DAI belongs to the same DAI sequence as the previous DAI sequence because the value of the first DSF has not been toggled from the DSF value of the previous DCI (e.g., DCI scheduling the PDSCH of slot #(n+3)). For example, the first DAI may belong to a DAI sequence (e.g., DAI sequence 0) starting in slot group #A. In addition, since the value of the second DSF of 1 has not been toggled from the value of the first DSF, the second DAI belongs to the same DAI sequence as the previous DAI sequence (i.e., DAI sequence 0). Then, the UE may transmit the A/N feedback generated based on the DAI sequence 0 in slot #(n+12). Specifically, the UE may generate the A/N feedback based on a DAI sequence (i.e., DAI=1/2/3/4/1/2) starting from a time point corresponding to the previous A/N feedback (e.g., slot group #A). Since there is no PDSCH reception corresponding to DAI=4, the UE may set the A/N corresponding to DAI=4 as NACK (or DTX) in the A/N feedback of slot #(n+10).

FIG. 16 is a flowchart illustrating a signal reception method according to embodiments of the present disclosure.

Referring to FIG. 16, embodiments of the present disclosure, which may be performed by a communication device, may include receiving DCI including DL scheduling information and a PRI (S1101), receiving DL data based on the DCI (S1103), performing LBT for a plurality of PUCCH resources corresponding to a value of the PRI (S1105), and transmitting ACK/NACK information for the DL data in one or more PUCCH resources in which LBT is successful, among the plurality of PUCCH resources (S1107).

Specifically, the plurality of PUCCH resources may be candidate T-domain resources distinguished in time. In this case, LBT is sequentially performed in the time domain, and ACK/NACK information for the DL data may be transmitted in one or more PUCCH resources including the PUCCH resource in which LBT is initially successful.

Alternatively, the plurality of PUCCH resources may be candidate F-domain resources distinguished in frequency. In this case, LBT is simultaneously performed in the frequency domain, and as a result, ACK/NACK information for the DL data may be transmitted in one or more PUCCH resources in which LBT is successful.

An LBT type configured for the UE for ACK/NACK information transmission may be LBT type A or X, or LBT type B or Y. When the LBT type for the ACK/NACK information transmission is LBT type A or X, the number of PUCCH resources corresponding to the value of the PM may be set to be smaller than the number of PUCCH resources corresponding to the value of the PM, when the LBT type is LBT type B or Y.

In addition to the operation of FIG. 16, one or more of the operations described with reference to FIGS. 1 to 15 may be combined and additionally performed.

Network Access and Communication Process

The UE may perform a network access process to perform the above-described/proposed procedures and/or methods. For example, the UE may receive and store system information and configuration information required to perform the above-described/proposed procedures and/or methods during network access (e.g., BS access). The configuration information required for the present disclosure may be received by higher-layer signaling (e.g., RRC signaling or MAC-layer signaling).

Figure 17:
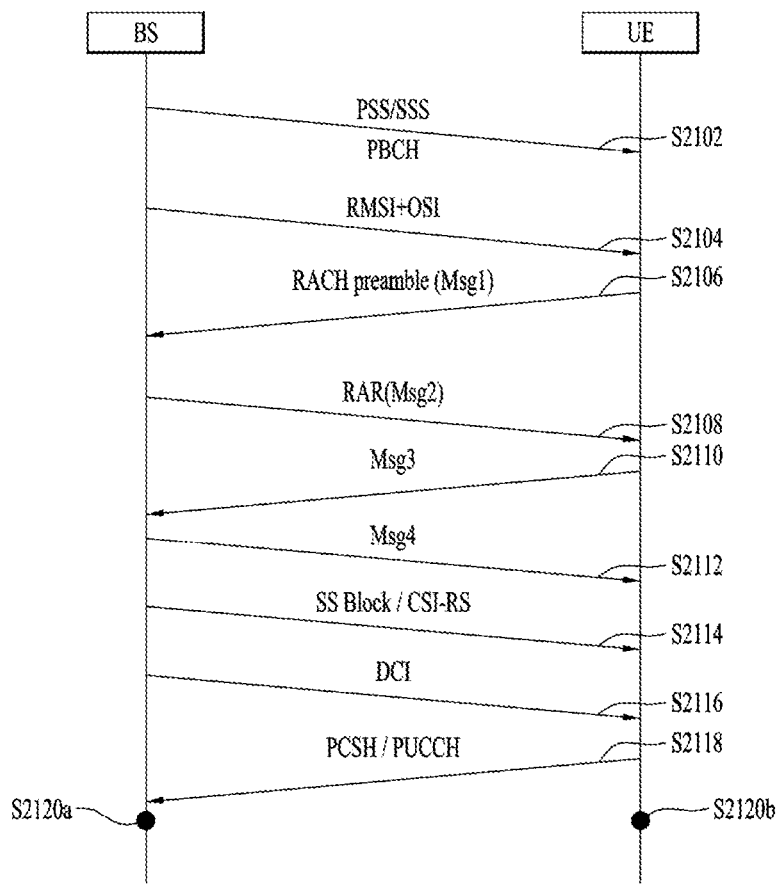

FIG. 17 is a diagram illustrating an initial network access and subsequent communication process. In NR, a physical channel and an RS may be transmitted by beamforming. When beamforming-based signal transmission is supported, beam management may follow, for beam alignment between a BS and a UE. Further, a signal proposed by the present disclosure may be transmitted/received by beamforming. In RRC IDLE mode, beam alignment may be performed based on an SSB, whereas in RRC CONNECTED mode, beam alignment may be performed based on a CSI-RS (in DL) and an SRS (in UL). On the contrary, when beamforming-based signal transmission is not supported, beam-related operations in the following description may be skipped.

Referring to FIG. 17, a BS (e.g., eNB) may periodically transmit an SSB (S702). The SSB includes a PSS/SSS/PBCH. The SSB may be transmitted by beam sweeping (see FIG. D5). The PBCH may include a master information block (MSB), and the MIB may include scheduling information for remaining minimum system information (RMSI). The BS may then transmit the RMSI and other system information (OSI) (S704). The RMSI may include information required for initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (S706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (S708), the UE may transmit Msg3 (e.g., RRC Connection Request) based on a UL grant included in the RAR (S710), and the BS may transmit a contention resolution message (Msg4) (S720). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S714). The SSB/CSI-RS may be used for the UE to generate a beam/CSI report. The BS may request the UE to transmit a beam/CSI report, by DCI (S716). In this case, the UE may generate a beam/CSI report based on the SSB/CSI-RS and transmit the generated beam/CSI report to the BS on a PUSCH/PUCCH (S718). The beam/CSI report may include a beam measurement result, information about a preferred beam, and so on. The BS and the UE may switch beams based on the beam/CSI report (S720a and S720b).

Subsequently, the UE and the BS may perform the above-described/proposed procedures and/or methods. For example, the UE and the BS may transmit a wireless signal by processing information stored in a memory or may process a received wireless signal and store the processed signal in a memory according to the proposal of the present disclosure, based on configuration information obtained in a network access process (e.g., a system information acquisition process, an RRC connection process on an RACH, and so on). The wireless signal may include at least one of a PDCCH, a PDSCH, or an RS on DL and at least one of a PUCCH, a PUSCH, or an SRS on UL.

In other words, one or more of the operations described before with reference to FIG. 14 and/or FIG. 16 may further be performed after the process illustrated in FIG. 17.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
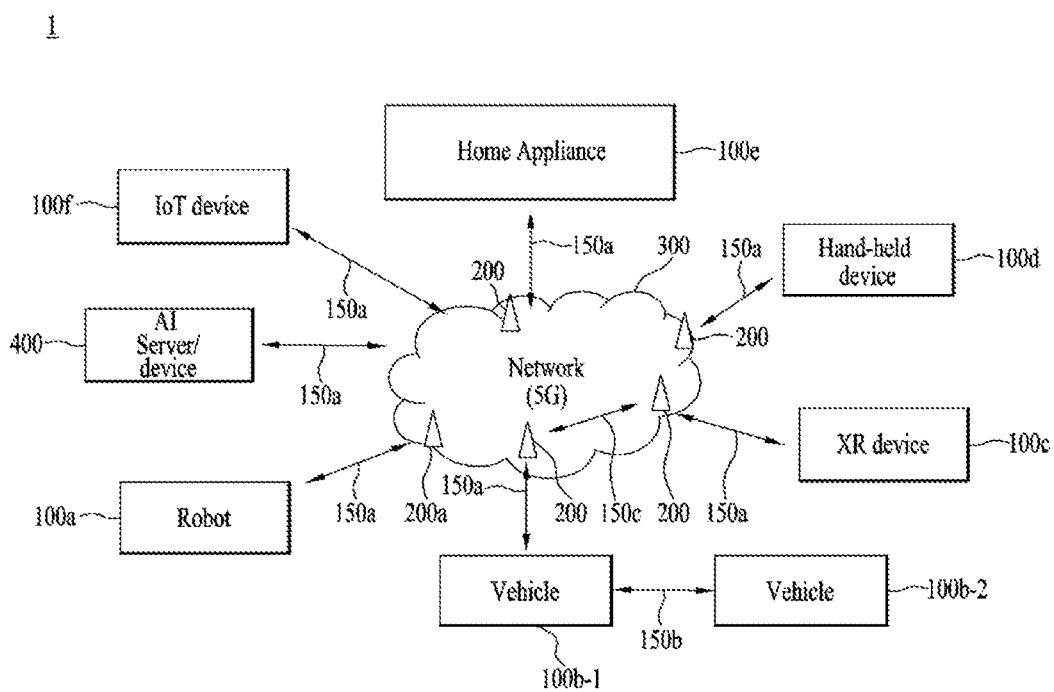
FIGS. 18 to 21 illustrate devices according to an embodiment of the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 19:
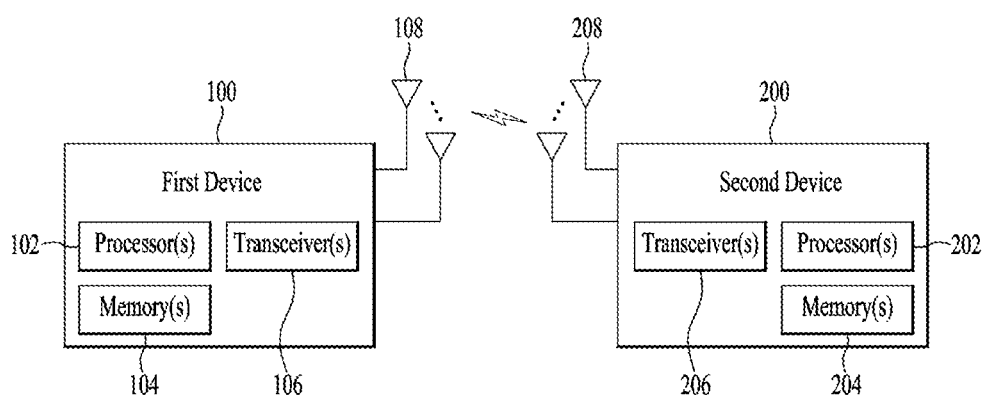

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 20:
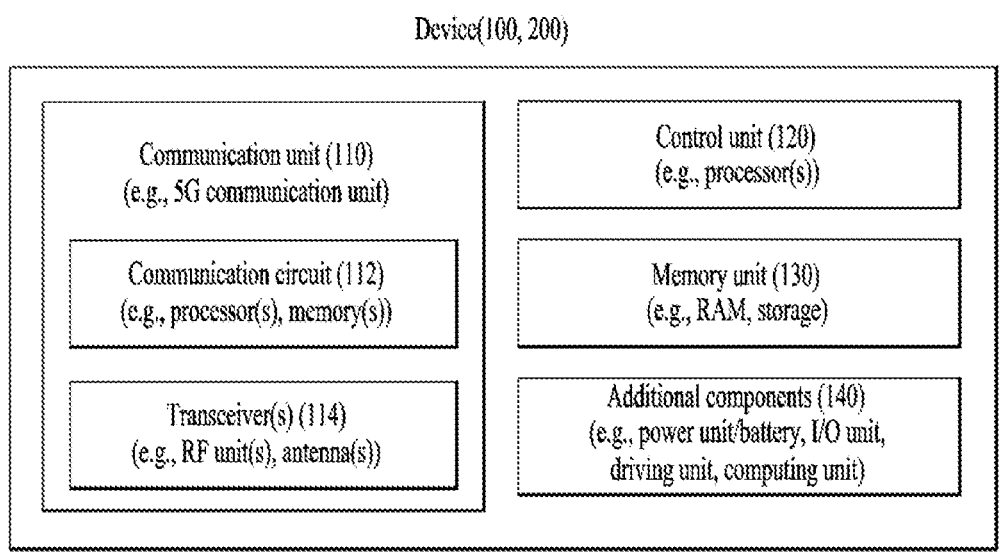

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 21:
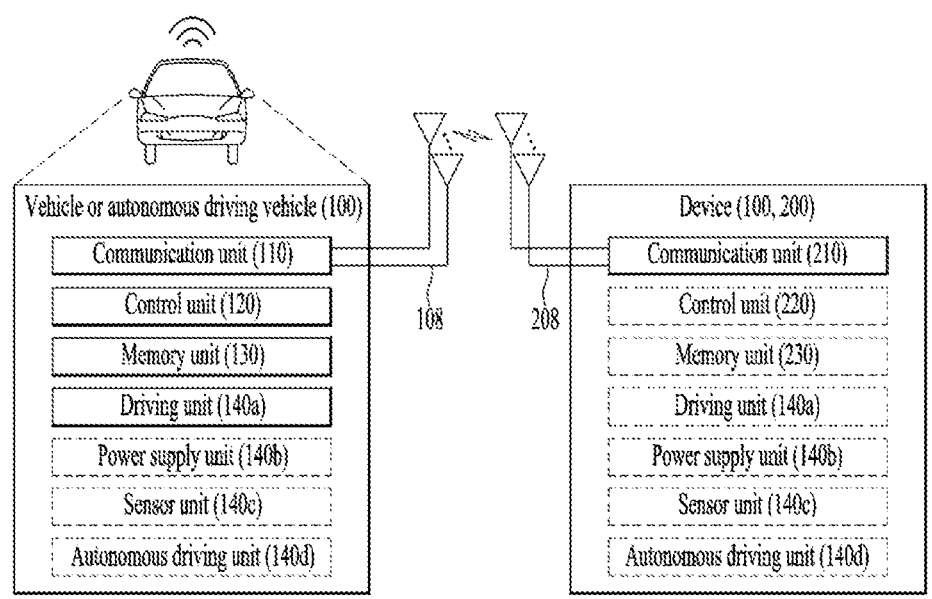

Example of Vehicle or Autonomous Driving Vehicle to which the Present Disclosure is Applied FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of transmitting an Acknowledgement/Negative acknowledgement (A/N) information by a user equipment (UE) in a wireless communication system, the method comprising:

receiving a plurality of Downlink Control Information (DCI) for scheduling a plurality of Physical Downlink Shared Channels (PDSCHs);

obtaining, from each of the plurality of DCI, (i) information related to a PDSCH group of a PDSCH corresponding each of the plurality of DCI and (ii) a Downlink Assignment Index (DAI) for the PDSCH;

receiving the plurality of PDSCHs based on the plurality of DCI;

determining an A/N information corresponding only to at least one PDSCH, among the plurality of PDSCHs, based on at least one DCI for scheduling the at least one PDSCH among the plurality of DCI, wherein the at least one PDSCH is included in a same PDSCH group with a PDSCH group related to a last received DCI among the plurality of DCI, and wherein the last received DCI is included in the at least one DCI, and transmitting the A/N information.

2. The method of claim 1, wherein, based on that the at least one PDSCH is included in a first PDSCH group and one or more PDSCHs in which are received based on one or more DCI, other than the at least one DCI, are included in a second PDSCH group, two A/N information are generated for each of the at least one PDSCH and the one or more PDSCHs.

3. The method of claim 2, wherein, the two A/N information are transmitted via a A/N signal.

4. The method of claim 1, wherein the DAI informing a position of PDSCH within corresponding PDSCH group.

5. The method of claim 1, wherein the A/N information is transmitted based on Listen-Before-Talk (LBT) operation.

6. A user equipment (UE) for transmitting an Acknowledgement/Negative acknowledgement (A/N) information in a wireless communication system, the UE comprising:
   at least one transceiver;
   at least one processor; and
   at least one computer memory operably connectable to the at least one processor and storing instructions that, when executed by the at least one processor, perform operations comprising:
   receiving, via the at least one transceiver, a plurality of Downlink Control Information (DCI) for scheduling a plurality of Physical Downlink Shared Channels (PDSCHs);
   obtaining, from each of the plurality of DCI, (i) information related to a PDSCH group of a PDSCH corresponding each of the plurality of DCI and (ii) a Downlink Assignment Index (DAI) for the PDSCH;
   receiving, via the at least one transceiver, the plurality of PDSCHs based on the plurality of DCI;
   determining an A/N information corresponding only to at least one PDSCH, among the plurality of PDSCHs, based on at least one DCI for scheduling the at least one PDSCH among the plurality of DCI,
   wherein the at least one PDSCH is included in a same PDSCH group with a PDSCH group related to a last received DCI among the plurality of DCI, and
   wherein the last received DCI is included in the at least one DCI; and
   transmitting, via the at least one transceiver, the A/N information.

7. The UE of claim 6, wherein, based on that the at least one PDSCH is included in a first PDSCH group and one or more PDSCHs in which are received based on one or more DCI, other than the at least one DCI are included in a second PDSCH group, two A/N information are generated for each of the at least one PDSCH and the one or more PDSCHs.

8. The UE of claim 7, wherein, the two A/N information are transmitted via a A/N signal.

9. The UE of claim 6, wherein the DAI informing a position of PDSCH within corresponding PDSCH group.

10. The UE of claim 6, wherein the A/N information is transmitted based on Listen-Before-Talk (LBT) operation.

11. An apparatus for transmitting an Acknowledgement/Negative acknowledgement (A/N) information in a wireless communication system, the apparatus comprising:
   at least one processor; and
   at least one computer memory operably connectable to the at least one processor and storing instructions that, when executed by the at least one processor, perform operations comprising:
   receiving a plurality of Downlink Control Information (DCI) for scheduling a plurality of Physical Downlink Shared Channels (PDSCHs);
   obtaining, from each of the plurality of DCI, (i) information related to a PDSCH group of a PDSCH corresponding each of the plurality of DCI and (ii) a Downlink Assignment Index (DAI) for the PDSCH;
   receiving the plurality of PDSCHs based on the plurality of DCI;
   determining an A/N information corresponding only to at least one PDSCH, among the plurality of PDSCHs, based on at least one DCI for scheduling the at least one PDSCH among the plurality of DCI,
   wherein the at least one PDSCH is included in a same PDSCH group with a PDSCH group related to a last received DCI among the plurality of DCI, and
   wherein the last received DCI is included in the at least one DCI; and
   transmitting the A/N information.

\* \* \* \* \*